(12) United States Patent
Yamaguchi et al.

(10) Patent No.: US 7,159,142 B2
(45) Date of Patent: Jan. 2, 2007

(54) PSEUDO I/O SYSTEM AND METHOD

(75) Inventors: Hirobumi Yamaguchi, Kawasaki (JP); Masakazu Suzuki, Kawasaki (JP); Kayoko Isshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 340 days.

(21) Appl. No.: 10/028,279

(22) Filed: Dec. 28, 2001

(65) Prior Publication Data
US 2003/0023904 A1 Jan. 30, 2003

(30) Foreign Application Priority Data
Jul. 27, 2001 (JP) .............................. 2001-227801

(51) Int. Cl.
*G06F 11/00* (2006.01)
(52) U.S. Cl. ........................... 714/28; 714/25; 703/21; 703/23
(58) Field of Classification Search ................. 714/25, 714/55, 10, 43, 28; 703/23, 21
See application file for complete search history.

(56) References Cited

U.S. PATENT DOCUMENTS

| | | | | |
|---|---|---|---|---|
| 5,440,697 A | * | 8/1995 | Boegel et al. ................. 703/21 |
| 5,996,101 A | * | 11/1999 | Masumoto .................. 714/738 |
| 6,049,894 A | * | 4/2000 | Gates ........................... 714/41 |
| 6,546,507 B1 | * | 4/2003 | Coyle et al. .................. 714/43 |
| 6,651,123 B1 | * | 11/2003 | Hutchison et al. .......... 710/200 |
| 6,704,894 B1 | * | 3/2004 | Kania .......................... 714/724 |
| 6,728,668 B1 | * | 4/2004 | Kitamorn et al. ............. 703/22 |
| 6,745,345 B1 | * | 6/2004 | Cabezas et al. ............... 714/41 |
| 7,047,176 B1 | * | 5/2006 | Klevans et al. ............... 703/21 |
| 2002/0026303 A1 | * | 2/2002 | Watanabe et al. ............. 703/25 |
| 2002/0095624 A1 | * | 7/2002 | Cabezas et al. ............... 714/43 |
| 2003/0005359 A1 | * | 1/2003 | Magliocco .................... 714/25 |

FOREIGN PATENT DOCUMENTS

| | | |
|---|---|---|
| JP | 5-73446 | 3/1993 |
| JP | 6-52072 | 2/1994 |

* cited by examiner

*Primary Examiner*—Robert Beausoliel
*Assistant Examiner*—Marc Duncan
(74) *Attorney, Agent, or Firm*—Staas & Halsey LLP

(57) ABSTRACT

A pseudo I/O system and method, which can be configured at low cost and simulates an actual I/O device by making a connection to a device to be tested, is configured by a setting unit defining error contents of a simulation target and setting the contents in a setting file; a receiving unit receiving a command from a device to be tested; a pseudo I/O unit processing the command received by the receiving unit if contents corresponding to the command are set when referencing the setting file, and performing a normal reply process if the contents corresponding to the command are not set; and a transmitting unit returning data after being processed to the device to be tested at a request source.

17 Claims, 31 Drawing Sheets

FIG. 6A

| SETTING FILE | | | |
|---|---|---|---|
| COMMAND | VALID/INVALID | ACTION | ERROR FILE |
| TEST UNIT READY | VALID | Control SYSTEM | error_file1 |
| | | | |

FIG. 6B

| ERROR FILE (error_file1) | |
|---|---|
| TIMING | ERROR CONTENTS |
| WHEN REPLY DATA IS RETURNED | CHANGES REPLY DATA (EX: GOOD(0x00)→BUSY(0x08)) |

FIG. 6C

| INITIATOR SCSI COMMAND | |
|---|---|
| COMMAND | CONTENTS |
| TEST UNIT READY | 00 00 00 00 00 00 |

FIG. 6D

| STATUS | |
|---|---|
| STATUS | VALUE |
| GOOD | 0 |
| BUSY | 8 |

FIG. 8A

| SETTING FILE | | | |
|---|---|---|---|
| COMMAND | VALID/INVALID | ACTION | ERROR FILE |
| READ | VALID | Read SYSTEM | error_file2 |
| | | | |

FIG. 8B

| ERROR FILE (error_file2) | |
|---|---|
| TIMING | ERROR CONTENTS |
| WHEN REPLY DATA IS RETURNED | DOES NOT MAKE DATA TRANSFER |

FIG. 8C

| INITIATOR SCSI COMMAND | |
|---|---|
| COMMAND | CONTENTS |
| READ | 28 00 01 23 45 67 00 00 01 00 |

FIG. 8D

| STATUS | |
|---|---|
| STATUS | VALUE |
| GOOD | 0 |

FIG. 10A

| SETTING FILE | | | |
|---|---|---|---|
| COMMAND | VALID/INVALID | ACTION | ERROR FILE |
| READ | VALID | Read SYSTEM | error_file3 |
| | | | |

FIG. 10B

| ERROR FILE (error_file3) | |
|---|---|
| TIMING | ERROR CONTENTS |
| WHEN DATA TRANSFER IS MADE | ABORTS DATA TRANSFER AFTER MAKING DATA TRANSFER UP TO 0x200 BYTES |

FIG. 10C

| INITIATOR SCSI COMMAND | |
|---|---|
| COMMAND | CONTENTS |
| READ | 28 00 01 23 45 67 00 00 02 00 |

FIG. 10D

| INITIATOR SCSI COMMAND | |
|---|---|
| MESSAGE | VALUE |
| ABORT | 06 |

| SETTING FILE |||| 
|---|---|---|---|
| COMMAND | VALID/INVALID | ACTION | ERROR FILE |
| TEST UNIT READY | VALID | Control SYSTEM | error_file4 |
|  |  |  |  |

| ERROR FILE (error_file4) ||
|---|---|
| TIMING | ERROR CONTENTS |
| WHEN REPLY DATA IS TRANSMITTED | RETRANSMITS REPLY DATA |

FIG. 12C

| INITIATOR SCSI COMMAND ||
|---|---|
| COMMAND | CONTENTS |
| TEST UNIT READY | 00 00 00 00 00 00 |

FIG. 12D

| STATUS ||
|---|---|
| STATUS | VALUE |
| GOOD | 0 |

| CDB SETTING FILE ||||
|---|---|---|---|
| COMMAND | VALID/INVALID | ACTION | ERROR FILE |
| READ | VALID | Read SYSTEM | error_file5 |
|  |  |  |  |

| CDB ERROR FILE (error_file5) ||
|---|---|
| TIMING | ERROR CONTENTS |
| WHEN DATA IS TRANSMITTED | ENDLESSLY MAKES DATA TRANSFER |

FIG. 14C

| INITIATOR SCSI COMMAND ||
|---|---|
| COMMAND | CONTENTS |
| READ | 28 00 01 23 45 67 00 00 02 00 |

F I G. 1 6 A

29

| SETTING FILE | | | |
|---|---|---|---|
| COMMAND | VALID/INVALID | ACTION | ERROR FILE |
| READ | VALID | Read SYSTEM | error_file6 |
| | | | |

F I G. 1 6 B

28

| ERROR FILE (error_file6) | |
|---|---|
| TIMING | ERROR CONTENTS |
| WHEN DATA TRANSFER IS MADE | TRANSMITS DIVIDED DATA IN UNITS OF 0x200 BYTES |

F I G. 1 6 C

| INITIATOR SCSI COMMAND | |
|---|---|
| COMMAND | CONTENTS |
| READ | 28 00 01 23 45 67 00 00 0a 00 |

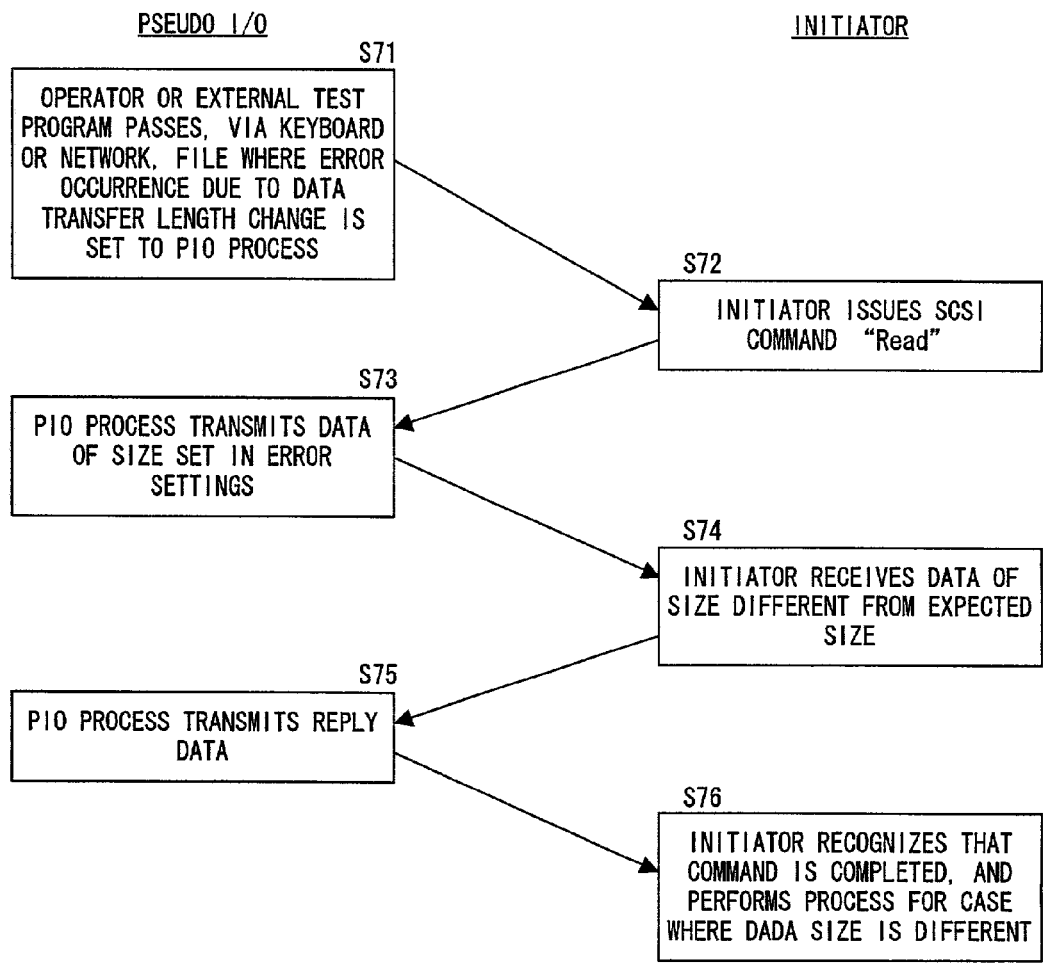
F I G. 1 7

| SETTING FILE | | | |
|---|---|---|---|
| COMMAND | VALID/INVALID | ACTION | ERROR FILE |
| READ | VALID | Read SYSTEM | error_file7 |
| | | | |

| ERROR FILE (error_file7) | |
|---|---|
| TIMING | ERROR CONTENTS |
| WHEN DATA TRANSFER IS MADE | CHANGES DATA TRANSFER SIZE TO 0x200 BYTES |

FIG. 18C

| INITIATOR SCSI COMMAND | |
|---|---|
| COMMAND | CONTENTS |
| READ | 28 00 01 23 45 67 00 00 0a 00 |

FIG. 18D

| STATUS | |
|---|---|
| STATUS | VALUE |
| GOOD | 0 |

| SETTING FILE | | | |
|---|---|---|---|
| COMMAND | VALID/INVALID | ACTION | ERROR FILE |
| READ | VALID | Read SYSTEM | error_file8 IF LBA=0x22222222 |
| | | | |

| ERROR FILE (error_file8) | |
|---|---|
| TIMING | ERROR CONTENTS |
| WHEN REPLY DATA IS RETURNED | CHANGES REPLY DATA (EX: GOOD(0x00)→BUSY(0x08)) |

FIG. 20C

| INITIATOR SCSI COMMAND | |
|---|---|
| COMMAND | CONTENTS |
| READ | 28 00 11 11 11 11 00 00 0a 00 |
| READ | 28 00 22 22 22 22 00 00 0a 00 |

FIG. 20D

| STATUS | |
|---|---|
| STATUS | VALUE |
| GOOD | 0 |
| BUSY | 8 |

FIG. 22A                                                             29

| SETTING FILE | | | |
|---|---|---|---|
| COMMAND | VALID/INVALID | RETRY ERROR | ERROR FILE |
| READ | VALID | EXISTS | error_file9 IF LBA=0x22222222 |
| | | | |

FIG. 22B                                                             28

| ERROR FILE (error_file9) | |
|---|---|
| TIMING | ERROR CONTENTS |
| WHEN REPLY DATA IS RETURNED | CHANGES REPLY DATA (EX: GOOD(0x00) →BUSY(0x08)) |

FIG. 22C

| INITIATOR SCSI COMMAND | |
|---|---|
| COMMAND | CONTENTS |
| READ | 28 00 11 11 11 11 00 00 0a 00 |

FIG. 22D

| STATUS | |
|---|---|
| STATUS | VALUE |
| GOOD | 0 |
| BUSY | 8 |

29

| SETTING FILE | | | |
|---|---|---|---|
| COMMAND | VALID/INVALID | ACTION | ERROR FILE |
| TEST UNIT READY | VALID | Control SYSTEM | error_file10 |
| | | | |

28

| ERROR FILE (error_file10) | |
|---|---|
| TIMING | ERROR CONTENTS |
| WHEN REPLY DATA IS RETURNED | MAKES FAULT IN SIGNAL TRANSMITTED OVER CABLE (EX: MAKES Link Failure OCCUR) |

| INITIATOR SCSI COMMAND | |
|---|---|
| COMMAND | CONTENTS |
| TEST UNIT READY | 00 00 00 00 00 00 |

| STATUS | |
|---|---|
| STATUS | VALUE |
| GOOD | 0 |
| BUSY | 8 |

| LINK ERROR SETTING FILE (error_file11) ||
|---|---|
| TIMING | ERROR CONTENTS |
| WHEN OPN SIGNAL IS RECEIVED | CONTINUES TO TRANSMIT CLS SIGNAL FOR ONE MINUTE |

FIG. 27B

| INITIATOR SCSI COMMAND ||
|---|---|
| COMMAND | CONTENTS |
| TEST UNIT READY | 00 00 00 00 00 00 |

FIG. 29A

| LINK ERROR SETTING FILE (error_file12) ||
|---|---|
| TIMING | ERROR CONTENTS |
| WHEN ABTS FRAME IS RECEIVED | TRANSMITS BA_RJT FRAME |

FIG. 29B

| INITIATOR SCSI COMMAND ||
|---|---|
| COMMAND | CONTENTS |
| TEST UNIT READY | 00 00 00 00 00 00 |

| PROCESS SETTING FILE (FOR MAGNETIC DISK DEVICE) | | | |
|---|---|---|---|
| COMMAND | VALID/INVALID | ACTION | ERROR FILE |
| TEST UNIT READY | VALID | Control SYSTEM | NONE |
| SEEK | VALID | Control SYSTEM | NONE |
| ERASE | INVALID | Control SYSTEM | NONE |
| ... | ... | ... | ... |

COMMANDS SPECIFIC TO DISK DEVICE

| PROCESS SETTING FILE (FOR MAGNETIC TAPE DEVICE) | | | |
|---|---|---|---|
| COMMAND | VALID/INVALID | ACTION | ERROR FILE |
| TEST UNIT READY | VALID | Control SYSTEM | NONE |
| SEEK | INVALID | Control SYSTEM | NONE |
| ERASE | VALID | Control SYSTEM | NONE |
| ... | ... | ... | ... |

COMMANDS SPECIFIC TO TAPE DEVICE

FIG. 31A

ERROR SCHEDULE FILE (schedule00) 30

| SETTING TYPE | COMMAND | LUN | SETTING CONTENTS |
|---|---|---|---|
| CDB PROCESS SETTING FILE | NONE | 0 | cdb_file0 |
| CDB ERROR SETTING FILE | TEST UNIT READY | 0 | error_file01, error_file02 |
| CDB ERROR SETTING FILE | READ | 0 | error_file11 |
| CDB PROCESS SETTING FILE | WRITE | 1 | cdb_file1 |
| CDB ERROR SETTING FILE | NONE | 1 | error_file21, error_file22, error_file23 |
| CDB PROCESS SETTING FILE | NONE | 0 | cdb_file2 |
| CDB ERROR SETTING FILE | TEST UNIT READY | 0 | error_file31 |
| SETTING COMPLETION | NONE | NONE | NONE |
| ... | | | |
| NEXT CDB ERROR SCHEDULE FILE | NONE | NONE | schedule01 |

PIO PROCESS READ SETTINGS UP TO SETTING COMPLETION. UPON COMPLETION OF EXECUTION OF ALL OF READ ERRORS, PIO PROCESS FURTHER READS SETTINGS UP TO NEXT SETTING COMPLETION

FIG. 31B

ERROR SCHEDULE FILE (schedule01) 30

| SETTING TYPE | COMMAND | LUN | SETTING CONTENTS |
|---|---|---|---|
| CDB PROCESS SETTING FILE | NONE | 0 | cdb_file0 |
| CDB ERROR SETTING FILE | TEST UNIT READY | 0 | error_file01, error_file02 |
| CDB ERROR SETTING FILE | READ | 0 | error_file11 |
| SETTING COMPLETION | NONE | NONE | NONE |
| ... | | | |
| NEXT CDB ERROR SCHEDULE FILE | NONE | NONE | NONE |

PSEUDO I/O SYSTEM AND METHOD

BACKGROUND OF THE INVENTION

1. Field of the Invention

The present invention relates to a pseudo I/O system, which is connected to a device to be tested, simulating an actual I/O system, and a method thereof.

2. Description of the Related Art

Conventionally, there is a system comprising an I/O device connected to a SCSI or FC interface. Among others, for example, there is a system conducting various types of tests on an initiator. Its test method falls into 3 types.

FIGS. 1A, 1B, and 1C show the conventional three test methods.

The conventional three test methods include (1) a method conducting various types of tests by connecting to an initiator of an actual I/O device such as a hard disk drive, etc. (see FIG. 1A); (2) a method conducting various types of tests by connecting an analyzer having a test capability between an initiator and an actual I/O device (see FIG. 1B); and (3) a method conducting various types of tests by connecting to an initiator of a pseudo I/O system recited in Japanese Patent Publication No. 6-52072 or 5-73446 (see FIG. 1C).

If various types of tests are conducted on an initiator by connecting an actual I/O device to the initiator shown in FIG. 1A with the above described method (1), all of devices to be connected such as a hard disk drive, a tape drive, etc., for which the tests are to be conducted, must be prepared. Additionally, if attempts are made to conduct a test on devices whose type is the same, for example, hard disk drives whose type is the same but whose sector sizes are different, corresponding hard disk drives having different sector sizes must be prepared. Furthermore, it is extremely difficult to conduct a test on an initiator by making an abnormal operation such as no reply, timeout, etc. of an actual I/O occur, even if attempts are made to conduct such a test. This is because the actual I/O does not perform an abnormal operation, when it has no problem.

When various types of tests are conducted on an initiator by connecting an analyzer between the initiator shown in FIG. 1B and an actual I/O device with the above described method (2), it is troublesome that corresponding actual I/O devices must be prepared if the type of an actual I/O device is changed, or if the sector size of an actual I/O device is changed although the type of the device is the same.

Although various types of tests are conducted by connecting to an initiator a pseudo I/O system, which is shown in FIG. 1C and recited in each of the above described Japanese Patent Publications, with the above described method (3), the Japanese Patent Publications target only a test on an interface such as a SCSI interface, etc. Besides, data that are handled by the pseudo I/O system and a connected test system are test data that are set in a fixed manner, and different from those for actual use. Therefore, a test for actual use cannot be conducted. Furthermore, there are problems such that (1) a system cannot run unless a test capability is added to a device to be tested; (2) if a problem that occurs in actual use depends on an address to which data is written, or contents of data, the problem cannot be reproduced, because an interface for writing test address or data is the same as that for writing an address and data when a test is conducted is the same; and (3) data other than data for actual use must be transmitted to an interface to be tested, since settings of various tests must be transmitted to a pseudo I/O system via the interface to be tested such as a SCSI interface, etc.

SUMMARY OF THE INVENTION

The present invention aims at providing a system, which can be configured at low cost, simulating various types of target devices only by arranging a setting file or a simulated response file and by changing the contents of the files, and enabling a test to be conducted while performing the same operations as those of a device in actual use by setting the setting file or the simulated response file via an interface different from an interface to be tested.

FIG. 2 shows the configuration of the system according to the present invention, which is intended to attain the above described aim. In FIG. 2, a pseudo I/O device 1 is a device simulating an I/O device. Here, the pseudo I/O device 1 is configured by PIO (pseudo IO) processes 2, a control process 5, an adapter 7, a driver 8, etc.

Each of the PIO processes 2 controls pseudo operations such as an error of each type of an I/O device according to information set in a setting file 4. Here, each of the PIO processes is configured by a pseudo I/O unit 3, a setting file 4, etc.

The pseudo I/O unit 3 is a unit that performs processes such as a process for making an error occur according to the contents of the error set in the setting file 4. The pseudo I/O unit 3 will be described in detail later with reference to FIGS. 3 and 31. The setting file 4 is a file in which the contents of a defined error of an I/O device to be simulated, etc. are set. Also the setting file 4 will be described in detail later with reference to FIGS. 3 through 31.

The control process 5 is a process that performs processes such as a process for setting the contents of a defined error of an I/O device in the setting file 4. The driver 8 is a driver that transmits/receives data with a predetermined interface via an adapter.

An initiator 14, to which an I/O device (the pseudo I/O device 1 here) is connected, is a device to be tested, on which tests of various types of processes performed for various types of errors that are made to occur by the I/O device are conducted.

Next, the operations of the system are described.

The control process 5 receives files in which the contents of a defined error of a device to be simulated are set, and sets the contents in the setting file 4. The pseudo I/O unit 3 references the setting file 4 for a command received from the device to be tested. If a process corresponding to the above described command is set in the setting file 4, the pseudo I/O unit 3 performs the process according to the settings. If the corresponding process is not set, the pseudo I/O unit 3 performs a normal reply process, and returns data after being processed to the device to be tested at the request source.

At this time, the control process 5 sets as the setting file 4 the files in which the information of the I/O device to be simulated are set.

If settings are made when the setting file is referenced, after the process is performed according to the settings, the files themselves or the contents set in the files are deleted on demand, or the contents of the setting file is restored to those of normal settings of the files. As a result, a normal reply process is performed at the next time.

Additionally, if the contents of a hardware error are set in the setting file 4, the adapter 7 is made to let the hardware error occur according to an instruction from the PIO process 2. Furthermore, if the contents of an error of a protocol are set in the setting file 4, the error of a protocol is made to occur in a portion of the protocol that processes the protocol.

The timing at which a hardware or protocol error is made to occur is specified while a command is received from the device to be tested and processed.

Additionally, as the timing at which an error is made to occur, the timing at which an address to be processed and an address set in the setting file 4 match, or the timing at which an address to be processed and an error address stored when an error occurs match is used.

Furthermore, the time at which an error is made to occur can be specified to be any one of: the moment when the contents of an error are set in the setting file 4, a time at which data is received, a time at which transfer data becomes a specified data transfer size while being transferred, and a time at which a status signal is transmitted.

As a hardware or protocol error, any of the following can be used. For example, a delay in a transmission start time of a frame (data), a phenomenon that part or the whole of a frame is not transmitted, a change in the contents of a frame, a change in data transfer information, a change in a data transfer method, and a change in a link state, etc.

Accordingly, a setting file 4 is arranged in the pseudo I/O device 1 and the contents of the setting file 4 is only changed, thereby providing a low-cost pseudo I/O device, which can simulate various of types of devices to be simulated, and can conduct a test while performing the same operations as those of an actual device in use.

BRIEF DESCRIPTION OF THE DRAWINGS

FIGS. 6A through 6D explain file contents and command data, which relate to the operations of the present invention shown in FIG. 5;

FIGS. 8A through 8D explain file contents and command data, which relate to the operations of the present invention shown in FIG. 7;

FIGS. 10A through 10D explain file contents and command data, which relate to the operations of the present invention shown in FIG. 9;

FIGS. 12A through 12D explain file contents and command data, which relate to the operations of the present invention shown in FIG. 11;

FIGS. 14A through 14C explain file contents and command data, which relate to the operations of the present invention shown in FIG. 13;

FIGS. 16A through 16C explain file contents and command data, which relate to the operations of the present invention shown in FIG. 15;

FIG. 17 is a flowchart explaining the operations (No. 8) of the present invention;

FIGS. 18A through 18D explain file contents and command data, which relate to the operations of the present invention shown in FIG. 17;

FIG. 20 explain file contents and command data, which relate to the operations of the present invention shown in FIG. 19;

FIG. 22 explains file contents and command data, which relate to the operations of the present invention shown in FIG. 21;

FIG. 27 explains file contents and command data, which relate to the operations of the present invention shown in FIG. 26;

FIG. 29 explains file contents and command data, which relate to the operations of the present invention shown in FIG. 28;

FIGS. 30A and 30B exemplify settings of an error file (process setting file) for a magnetic disk, according to the present invention; and FIGS. 31A and 31B exemplify settings of an error schedule file, according to the present invention.

DESCRIPTION OF THE PREFERRED EMBODIMENTS

Next, preferred embodiments and their operations are sequentially described in detail with reference to FIGS. 2 through 31.

Figure 1A:
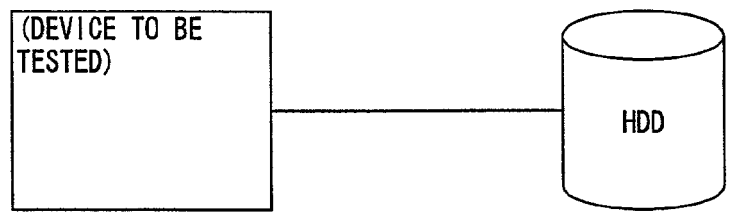
FIG. 1 explains conventional techniques.
Figure 1B:
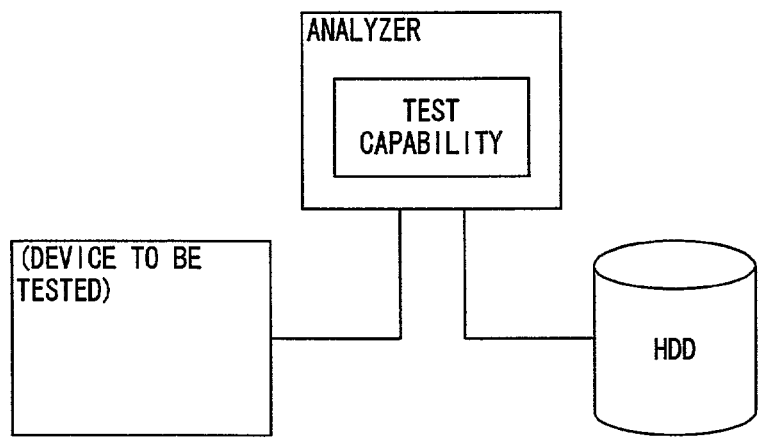
Figure 1C:
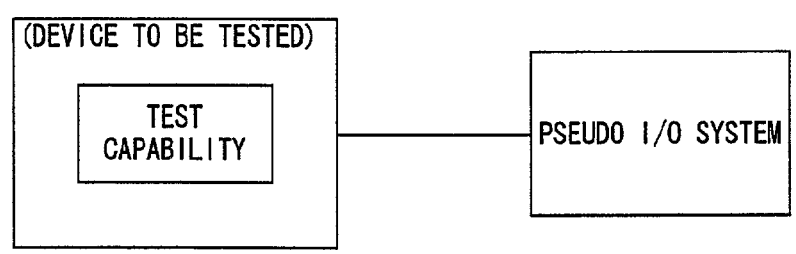
Figure 2:
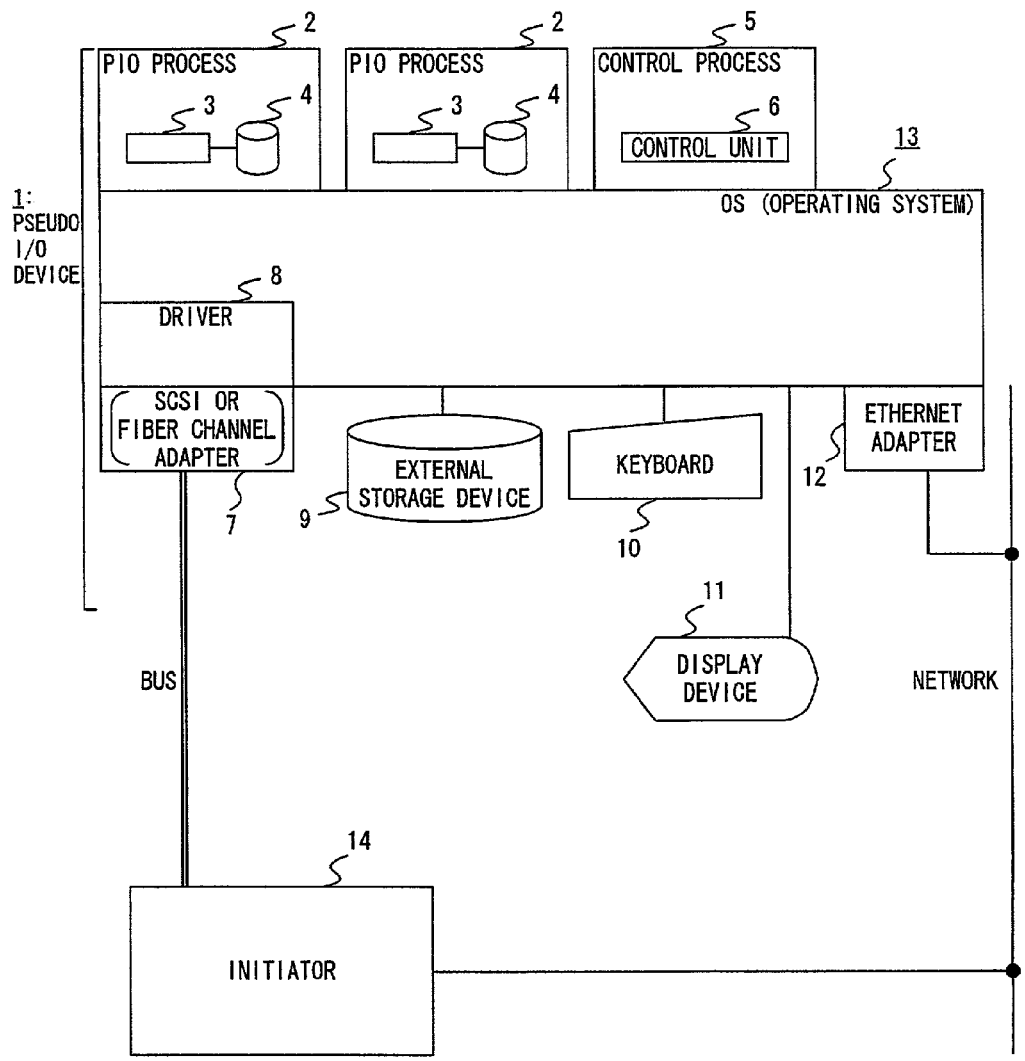
FIG. 2 shows the configuration of a system according to the present invention.

FIG. 2 shows the configuration of a system according to the present invention.

In this figure, a pseudo I/O device 1, which is connected to an initiator 14 via a bus (such as a SCSI bus), operates as a pseudo I/O device, and conducts on the initiator 14 a test of determining whether or not a process for an error is properly performed, by making an error, etc. occur. The pseudo I/O device 1 is configured by a plurality of PIO processes 2, a control process 5, an adapter 7, a driver 8, an external storage device 9, a keyboard 10, a display device 11, an Ethernet adapter 12, an OS 13, etc.

Each of the PIO processes 2 is a process performing various types of processes as a pseudo I/O process. Here, each of the PIO processes is configured by a pseudo I/O unit 3, a setting file 4, etc.

The pseudo I/O unit 3 performs processes such as a process for making an error of an I/O device occur, etc. These processes will be described later with reference to FIGS. 3 through 30.

The setting file 4 is a file in which information of an error made to occur in an I/O device, and the like are set. Also the setting file 4 will be described later with reference to FIGS. 2 through 30.

The control process 5 performs processes such as a process for setting predetermined information in the setting file 4 of the PIO process 2, and is configured by a control unit 6, etc.

The control unit 6 receives, via a network, files where the contents of a defined error that is made to occur in an I/O device are set, and performs processes such as a process for setting the contents of the received files in the setting file 4 of the PIO process, etc.

The adapter 7 is connected to a bus using a predetermined interface (such as a SCSI interface, a fiber channel, etc.), and transmits/receives a signal.

The driver 8 transmits/receives data via the adapter 7.

The external storage device 9 stores various types of data, and holds, for example, the contents set in the setting file 4.

The keyboard 10 inputs various types of instructions, data, and characters.

The display device 11 displays various items of information.

The Ethernet adapter 12 is an adapter, which is connected to a network, transmitting/receiving data.

The OS 13 is an operating system, which is a program controlling the entire system.

The initiator 14, to which an I/O device is connected via a bus, performs various types of processes. Here, the initiator 14 is a device to be tested, to which the pseudo I/O device 1 is connected, and on which a test of determining whether or not a process is performed at the time of an error occurrence is conducted.

Figure 3:
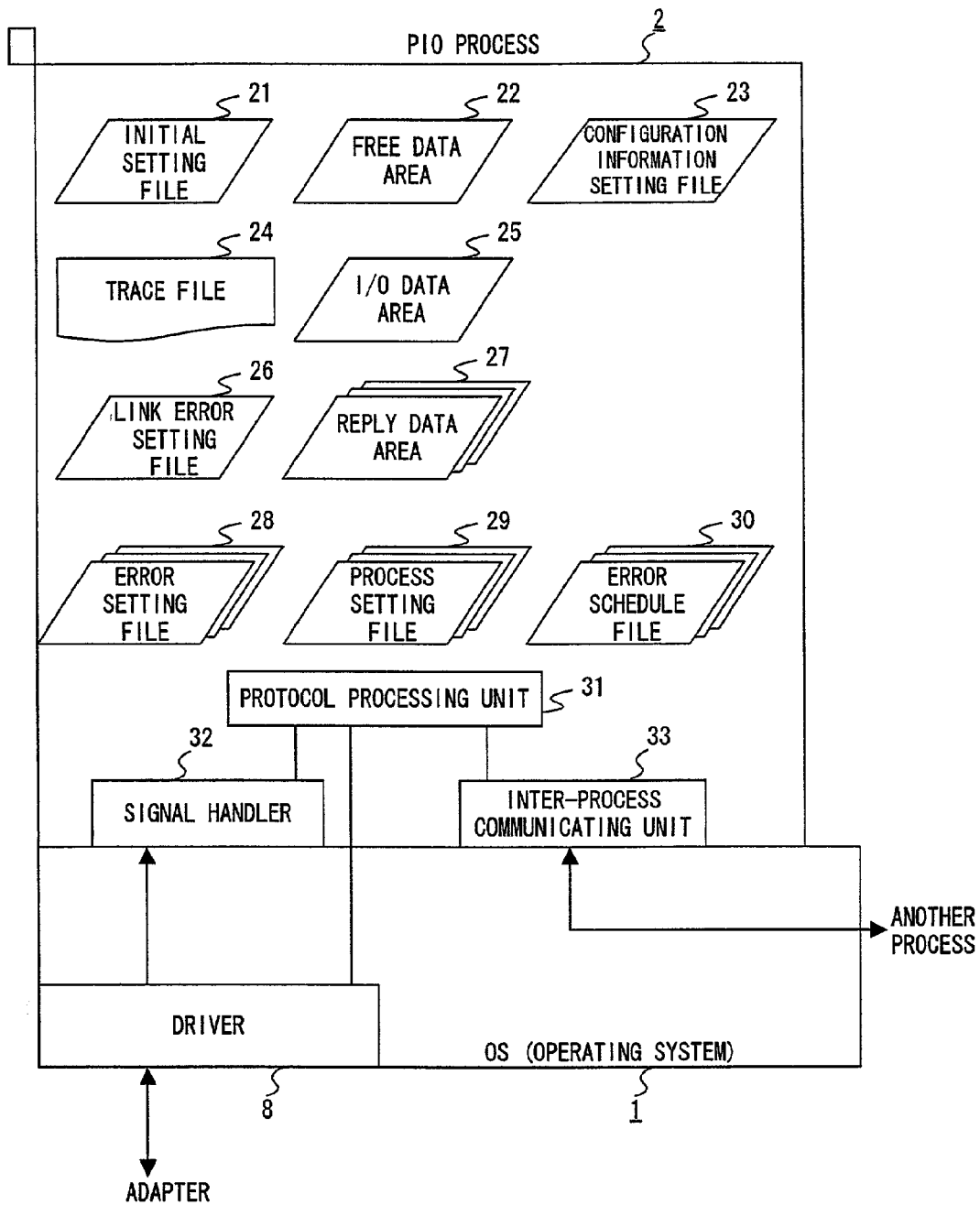
FIG. 3 shows the details of the configuration of the system according to the present invention.

FIG. 3 shows the details of the configuration of the system according to the present invention. This figure exemplifies the details of the configuration of the PIO process 2 and its periphery.

In FIG. 3, the PIO process 2 is an example of the details of the configuration of the PIO process shown in FIG. 2. The PIO process 2 is configured by an initial setting file 21, a FREE data area 22, a configuration information setting file 23, a trace file 24, an I/O data area 25, a LINK error setting file 26, a reply data area 27, an error setting file 28, a process setting file 29, an error schedule file 30, a protocol processing unit 31, a signal handler 32, an inter-process communicating unit 33, etc.

The initial setting file 21 specifies a file to be used, and specifies any of the following files.

FREE data area 22
configuration information setting file 23
trace file 24
I/O data area 25
LINK error setting file 26
reply data area 27
error setting file 28
process setting file 29
error schedule file 30
protocol processing unit 31
signal handler 32
inter-process communicating unit 33

The FREE data area 22 is a working data area.

The configuration information setting file 23 is a file where configuration information of an I/O device to be simulated, etc. are set.

The trace file 24 is a file where a history is stored.

The I/O data area 25 is an area for storing I/O data.

The LINK error setting file 26 is a file where a LINK error is set.

The reply data area 27 is an area for storing reply data.

The error setting file 28 is a file where the contents of an error are set.

The process setting file 29 is a file where the contents of a process for an error are set.

The error schedule file 30 is a file where a schedule for making an error occur is set.

The protocol processing unit 31 is a unit that performs various types of processes according to the process setting file 29.

The signal handler 32 is a routine transmitting/receiving data via the driver 8.

The inter-process communicating unit 33 is a unit transmitting/receiving data between processes.

Next, the operations of the configuration shown in FIG. 2 are sequentially described in detail with reference to FIGS. 4 through 31.

Figure 4:
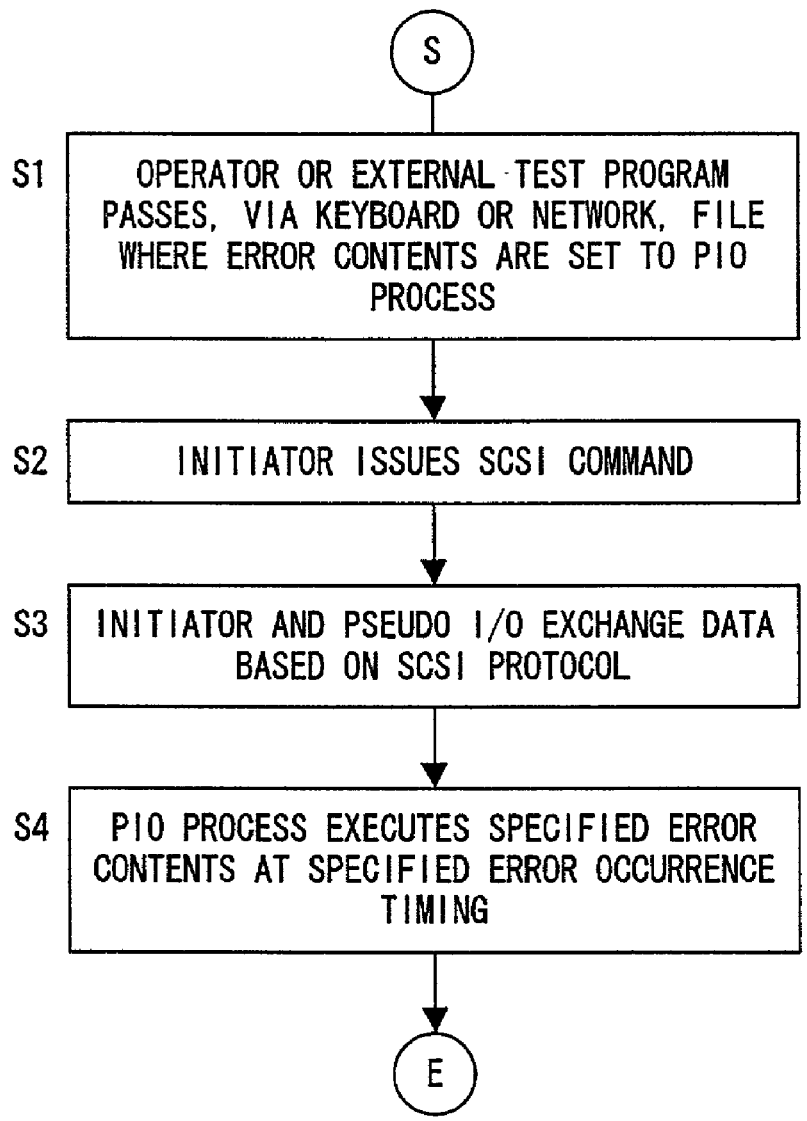
FIG. 4 is a flowchart explaining the operations (No. 1) of the present invention.

FIG. 4 is a flowchart explaining the operations (No. 2) of the present invention. This is a flowchart in the case where a process makes an error occur. In FIG. 4 and subsequent drawings, S1, S2, ... 11, ..., S21, ..., etc. represent process orders.

In FIG. 4, in step S1, an operator or an external program passes, respectively via a keyboard that the operator operates or a network, files where the contents of an error are set to the PIO process. This is a process in which the control process 5 once receives the files, which are input by an operator via the keyboard 10 of the pseudo I/O device 1 shown in FIG. 2 or received from the initiator 14 via the network and the Ethernet adapter 12, and sets the received files as the setting file 4 of the PIO process 2.

In step S2, the initiator issues a SCSI command. This is a process in which the initiator 14 shown in FIG. 2 transmits a SCSI command to a bus (SCSI bus in this case).

In step S3, data is exchanged between the initiator and the pseudo I/O device based on the SCSI protocol. This is a process in which data transmission/reception (data transmission/reception such as a data write to the pseudo I/O device 1 by issuing a Write command, or a data read from the pseudo I/O device 1 by issuing a Read command) is made with the SCSI protocol (SCSI interface) under normal conditions in response to the command issued in step S2 or a command next issued.

In step S4, the PIO process executes the contents of a specified error at specified error occurrence timing. This is a process in which, for example, the PIO process 2 of the pseudo I/O device 1 executes the error contents set in the setting file 4 at the error occurrence timing specified in the setting file 4 in the above described step 1, so that the error is made to occur. As a result, the initiator 14 detects the error, and performs a process corresponding to the error (such as a process for rereading data by reissuing the Read command, for example, if the error is a read error). In this way, a test of verifying that the initiator 14 can perform a proper process for the error can be conducted on the initiator 14.

As described above, after the contents of an error are set in the setting file 4 of the PIO process 2 of the pseudo I/O device 1 via a network or a keyboard, the initiator 14 issues a command to the pseudo I/O device 1, and performs a process corresponding to the error when the error is returned. By verifying that a process for an error is properly executed as described above, various types of tests can be easily conducted on the initiator 14. Various types of errors are sequentially described in detail below.

Figure 5:
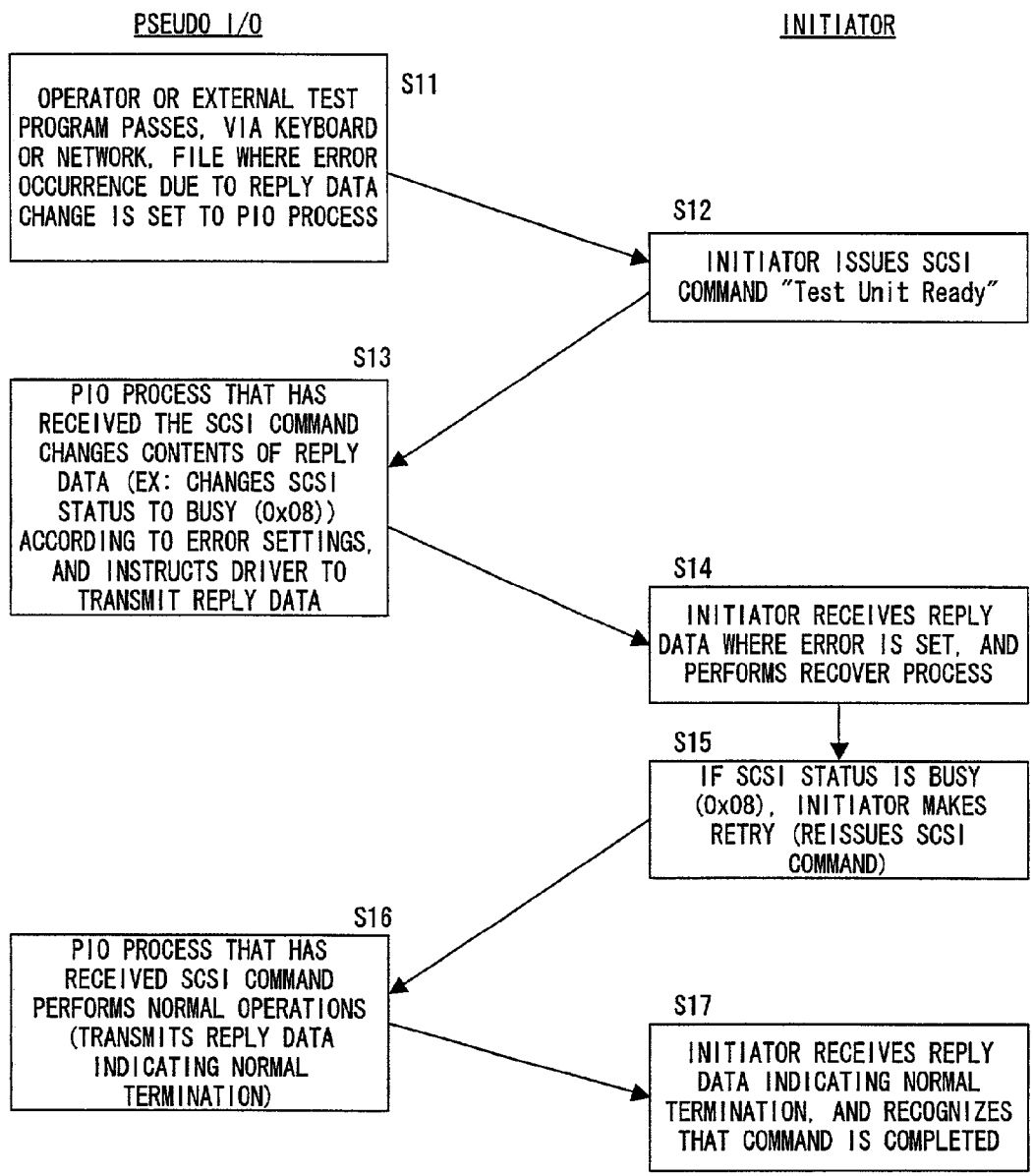
FIG. 5 is a flowchart explaining the operations (No. 2) of the present invention.

FIG. 5 is a flowchart explaining the operations of the present invention (No. 2). This flowchart exemplifies the operations for making an error occur by changing data. Here, a pseudo I/O device 1 on the left side represents that the pseudo I/O device 1 shown in FIG. 2 executes processes in below stages, whereas an initiator on the right side represents that the initiator 14 executes the processes in below stages. A pseudo I/O and an initiator in the subsequent drawings are similar.

In FIG. 5, in step S11, an operator or an external test program respectively passes, via a keyboard that operated by the operator or a network, files where an error that is made to occur by changing reply data is set to the PIO process 2. This is a process in which the control process 5 once receives the files where the contents of an error are set, which is input by an operator via the keyboard 10 of the pseudo I/O device 1 shown in FIG. 2, or received from the initiator 14 via the network and the Ethernet adapter 12, and sets the received files as the selling file 4 of the PIO process 2. In this way, the process selling file 29 and the error selling file 28, which are shown in FIGS. 6A and 6B to be described later, are set.

In step S12, the initiator issues a SCSI command "Test Unit Ready" (see FIG. 6C).

In step S13, the PIO process 2 that has received the SCSI command changes the contents of reply data according to the error settings. With this process, the PIO process 2 changes, for example, SCSI STATUS to BUSY (0x08), and instructs the driver to return this reply data. This is implemented in a way such that the PIO process 2 changes the contents of reply data, for example, changes the SCSI status to BUSY (0x08) according to the error contents (see FIGS. 6A and 6B) set in the setting file in step S11, and instructs the driver 8 to return the changed reply data (see FIG. 6D) in response to the SCSI command received via the bus. Note that the PIO process 2 deletes the error information set in the setting file, or restores the error information to the normal state after repeating the error process once or a specified number of times in step S13. As a result, a normal reply is returned in the next process.

In step S14, the initiator that has received the reply data transmitted in step S13 performs a recovery process. This is because the received reply data is reply data where the error is set. In step S15, the initiator 14 makes a retry (reissues the SCSI command) as the recover operation of step S14, if SCSI STATUS is BUSY (0x08).

In step S16, the PIO process 2 that has received the SCSI command reissued in step S15 performs a normal operation (transmits reply data indicating normal termination).

In step S17, the initiator 14 receives the reply data indicating the normal termination, and verifies that the SCSI command is completed.

As described above, after the contents of an error are set in the selling file 4 of the PIO process 2 of the pseudo I/O device 1 via a network or a keyboard, the initiator 14 issues a command to the pseudo I/O device 1, and makes the pseudo I/O device 1 return error reply data. Then, the initiator 14 reissues the command as the recovery process for the error. The PIO process returns normal reply data, so that the initiator 14 is normally terminated. In this way, the test program, which is not shown, within the initiator 14 can conduct a test on the initiator 14 including verifying whether the initiator 104 can perform a recovery process for an error.

FIGS. 6A through 6D explain file contents and command data, which relate to the above described operations shown in FIG. 5.

FIG. 6A exemplifies the process setting file 29. Namely, this figure exemplifies the contents set in the setting file 4 of the PIO process 2 in above described step S11 of FIG. 5. In this example, the following items of information are set as shown in FIG. 6A.
  command: Test Unit Ready
  valid/invalid: valid
  action: control system
  error file name: error_file1

FIG. 6B exemplifies the contents set in the error file having the above described name "error_file1". In this example, the following items of information are set as shown in FIG. 6B.
  timing: when reply data is returned
  error contents: changes reply data (for example, from GOOD (0x00) to BUSY (0x08))

The above described error contents are set in the process setting file 29 and the error file 28, so that the PIO process 2 can make the error occur according to the error contents set in the process setting file 29 and the error file 28, namely, the PIO process 2 can make the set error occur at the set error timing in response to a command issued from the initiator 14. Also in this case, the PIO process 2 deletes or invalidates the error contents after making the error occur once or a specified number of times. As a result, a normal reply is returned at the next time.

FIG. 6C exemplifies an initiator SCSI command. This exemplifies the SCSI command that the initiator 14 issues in the above described step S12 of FIG. 5. The following items of information are set as shown in FIG. 6C.
  command: Test Unit Ready
  contents: 00 00 00 00 00 00

FIG. 6D exemplifies STATUS. This shows the reply information when the PIO process 2 returns an error reply in the above described step S13 of FIG. 5. The following items of information are set as shown in FIG. 6D.
  status: GOOD or BUSY
  value: 0 or 8

Figure 7:
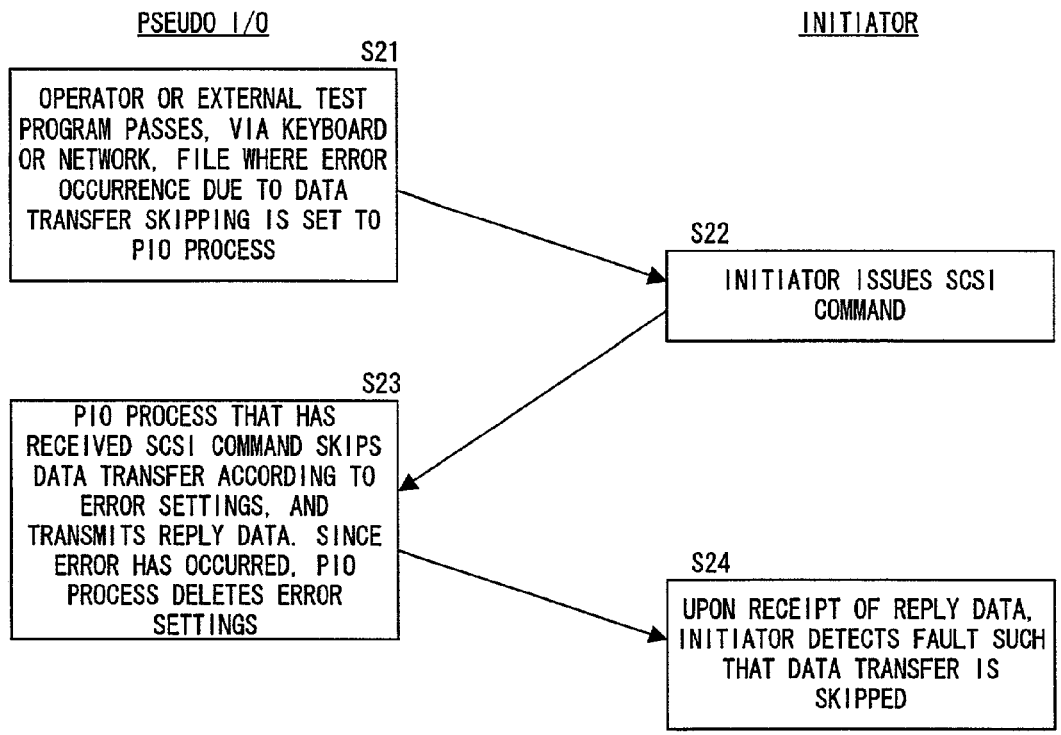
FIG. 7 is a flowchart explaining the operations (No. 3) of the present invention.

FIG. 7 is a flowchart explaining the operations (No. 3) of the present invention (No. 3). This flowchart exemplifies the operations for making an error occur by skipping the procedure stipulated in the SCSI protocol.

In FIG. 7, in step S21, an operator or an external test program passes, respectively via a keyboard that the operator operates or a network, files where an error occurrence due to data transfer skipping is set to the PIO process 2. As a result, files shown in FIGS. 8A and 8B to be described later are set as the setting file 4 of the PIO process 2.

In step S22, the initiator issues a SCSI command "Read" (see FIG. 8C).

In step S23, the PIO process 2 that has received the SCSI command skips a data transfer, namely, the PIO process 2 does not make the data transfer, and transmits only reply data according to the error contents set in the error file. After the PIO process 2 makes such an error occur, it deletes the settings of the error file. This is a process in which the PIO process 2 skips the data transfer and transmits reply data according to the error contents (see FIGS. 8A and 8B) set in the setting file in step S21 in response to the SCSI command received via the bus, and deletes or invalidates the error contents.

In step S24, upon receipt of the reply data transmitted in step S23, the initiator detects a fault such that the data transfer is skipped.

As described above, after the error contents of data transfer skipping are set in the setting file 4 of the PIO process 2 of the pseudo I/O device 1, the initiator 14 issues a command to the pseudo I/O device 1, and makes the pseudo I/O device 1 return error reply data. Then, the initiator 14 detects the fault such that the data transfer is skipped, according to the error reply data. In this way, the test program, which is not shown, within the initiator 14 can conduct on the initiator 14 a test of verifying that the initiator 14 can properly detect the transfer skipping error.

FIGS. 8A through 8D explain file contents and command data, which relate to the operations of the present invention shown in FIG. 7.

FIG. 8A exemplifies the process setting file 29. Namely, this figure exemplifies the contents set in the setting file 4 of the PIO process 2 in the above described step S21 of FIG. 7. The following items of information are set as shown in FIG. 8A.
  command: Read
  valid/invalid: valid
  action: read system
  error file name: error_file2

FIG. 8B exemplifies the contents set in the above described error file having the name "error_file2". In this example, the following items of information are set as shown in FIG. 8B.
  timing: none
  error contents: does not make data transfer By setting the above described error contents in the process setting file 29 and the error setting file 28, the PIO process 2 can make an error according to the error contents set in the process setting file 29 and the error setting file 28 occur, namely an error such that a data transfer is not made, in response to the command issued from the initiator 14.

FIG. 8C exemplifies an initiator SCSI command. This exemplifies the SCSI command that the initiator 14 issues in the above described step S22 of FIG. 7. The following items of information are set as shown in FIG. 8C.
  command: Read
  contents: 28 00 01 23 45 67 00 00 01 00

FIG. 8D exemplifies STATUS. This shows the reply information when the PIO process 2 returns the error reply in the above described step S23 of FIG. 7. The following items of information are set as shown in FIG. 8D.
  status: GOOD
  value: 0

Figure 9:
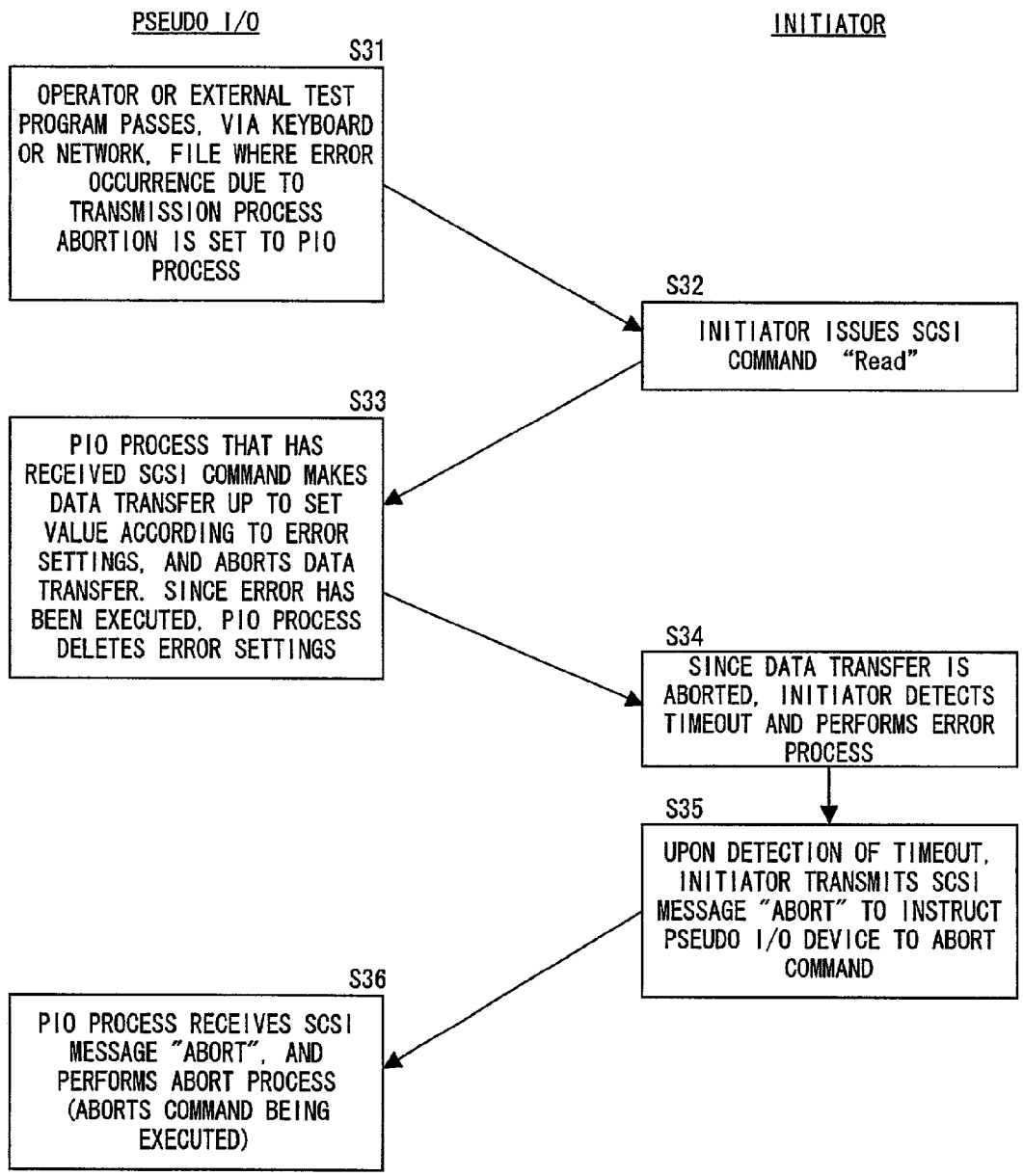
FIG. 9 is a flowchart explaining the operations (No. 4) of the present invention.

FIG. 9 is a flowchart explaining the operations (No. 4) of the present invention. This flowchart exemplifies the operations for making an error occur by aborting a process during the procedures stipulated in the SCSI protocol.

In this figure, in step S31, an operator or an external test program respectively passes, via a keyboard that the operator operates or a network, files where the contents of an error made to occur by aborting a transmission process are set to the PIO process. As a result, files which are shown in FIGS. 10A and 10B to be described later are set as the selling file 4 of the PIO process 2.

In step S32, the initiator issues the SCSI command "Read" (see FIG. 10C).

In step S33, the PIO process 2 that has received the SCSI command aborts a data transfer after making the data transfer up to the set value, according to the error contents set in the error file. Also in this case, the PIO process 2 deletes the set error contents, since it has executed the error. This is a process in which the PIO process 2 aborts the data transfer after making the transfer at the preset value, according to the error contents (see FIGS. 10A and 10B) set in the setting file in step S31 in response to the SCSI command received via the bus, and deletes or invalidates the error contents.

In step S34, upon receipt of the reply data transmitted in step S33, the initiator detects a timeout while waiting for data. This is because the data transfer is aborted. Since the initiator detects the timeout, it performs an error process.

In step S35, upon detection of the timeout, the initiator issues a SCSI message ABORT to instruct the target (the pseudo I/O device) to abort the command as the error process.

In step S36, the PIO process 2 receives the SCSI message ABORT, and performs a process for ABORT, namely, the PIO process 2 aborts the command process being executed.

As described above, after the error contents (transmission process abortion in this example) are set in the setting file 4 of the PIO process 2 of the pseudo I/O device 1, the initiator 14 issues a command to the pseudo I/O device 1. As a result, the transmission process is aborted based on the settings of the above described error contents, so that a timeout occurs. The initiator 14 detects the timeout, and transmits the SCSI message ABORT, which is the corresponding process, to make the pseudo I/O device 1 abort the command process being executed. In this way, the test program, which is not shown, within the initiator 14 can conduct on the initiator 14 a test of verifying that the initiator 14 transmits the SCSI message ABORT to the pseudo I/O device 1 when the transmission from the I/O device is stopped, and can make the I/O device abort the command being executed.

FIGS. 10A through 10D explain file contents and command data, which relate to the operations of the present invention shown in FIG. 9.

FIG. 10A exemplifies the process setting file 29. This exemplifies the contents set in the setting file 4 of the PIO process 2 in the above described step S31 of FIG. 9. The following items of information are set as shown in FIG. 10A.
  command: Read
  valid/invalid: valid
  action: read system
  error file name: error_file3

FIG. 10B exemplifies the contents set in the above described error file having the name "error_file3". In this example, the following items of information are set as shown in FIG. 10B.
  timing: when data is transferred
  error contents: aborts data transfer after making the transfer up to 0x200 bytes.

The above described error contents are set in the process setting file 29 and the error file 28, so that the PIO process 2 can make the error, namely, the error such that the data transfer is aborted after being made up to 0x200 bytes, occur according to the error contents set in the process setting file 29 and the error file 28 in response to the command issued from the initiator 14.

FIG. 10C exemplifies an initiator SCSI command. This exemplifies the SCSI command that the initiator 14 issues in the above described step S32 of FIG. 9. The following items of information are set as shown in FIG. 10C.
  command: Read
  contents: 28 00 01 23 45 67 00 00 02 00

FIG. 10D exemplifies a SCSI message. This shows the information of the SCSI message that the initiator transmits in the above described step S35 of FIG. 9. The following items of information are set as shown in FIG. 10D.
  message: ABORT
  value: 06

Figure 11:
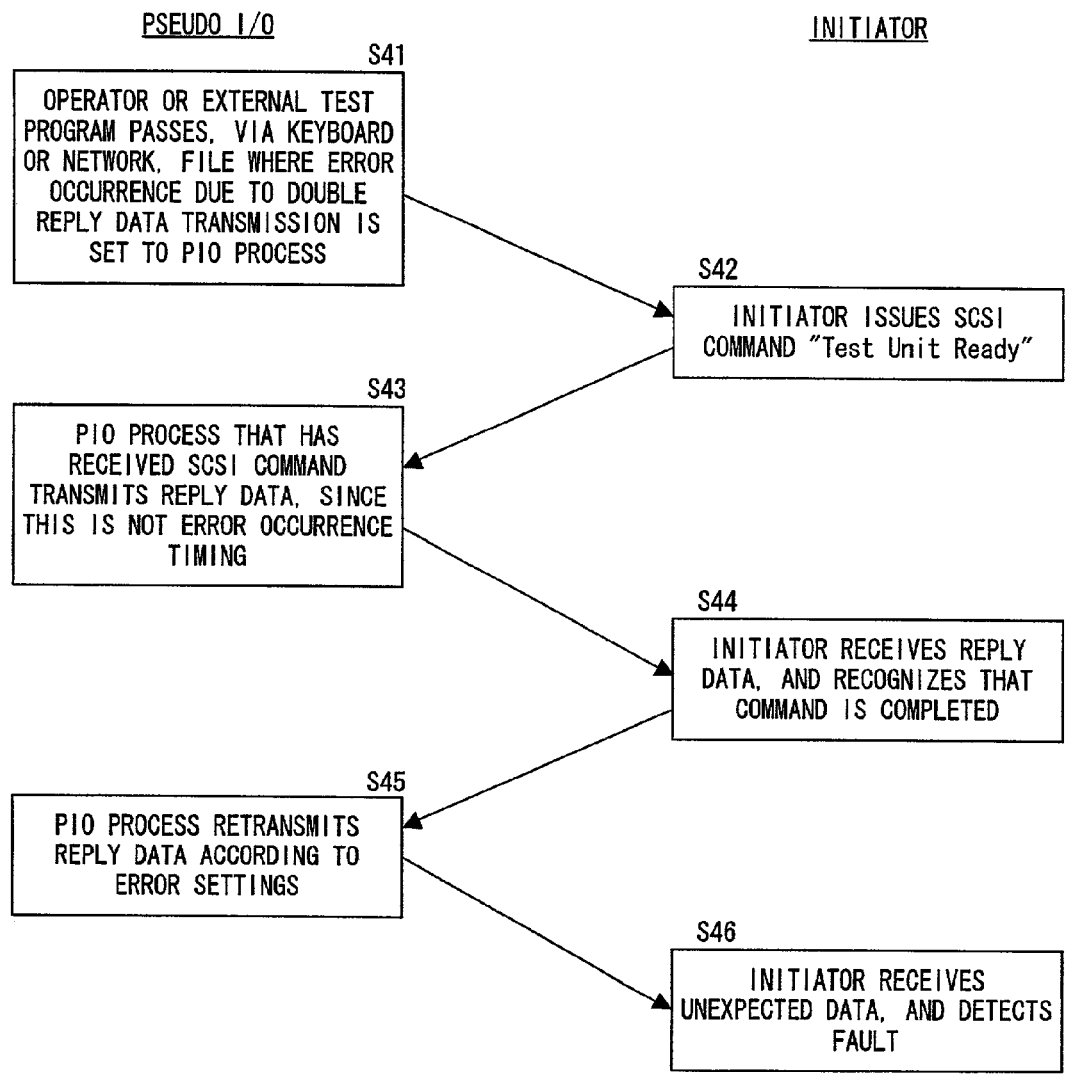
FIG. 11 is a flowchart explaining the operations (No. 5) of the present invention.

FIG. 11 is a flowchart showing the operations (No. 5) of the present invention. This flowchart exemplifies the operations for making an error occur by performing an extra procedure that is not stipulated in the SCSI protocol.

In this figure, in step S41, an operator or an external test program passes, respectively via a keyboard that the operator operates or a network, files where error contents such that transmission data is transmitted twice to the PIO process. As a result, files shown in FIGS. 12A and 12B to be described later are set as the setting file 4 of the PIO process 2.

In step S42, the initiator issues a SCSI command "Test Unit Ready" (see FIG. 10C).

In step S43, the PIO process 2 that has received the SCSI command returns reply data, since this time is not error occurrence timing. This is a process in which the PIO process 2 transmits reply data according to the error contents (see FIGS. 12A and 12B) set in the setting file in S41 in response to the SCSI command received via the bus, since this time is not the set error occurrence timing.

In step S44, the initiator receives the reply data, and recognizes that the command is completed.

In step S45, the PIO process 2 retransmits the reply data according to the error settings. This corresponds to the reply data transmission timing set in step S41 of FIGS. 12A and 12B.

In step S46, the initiator detects the fault since it receives the unexpected reply data.

As described above, after the error contents such that reply data is transmitted twice are set in the setting file 4 of the PIO process 2 of the pseudo I/O device 1, the initiator 14 issues a command to the pseudo I/O device 1. Then, the pseudo I/O device 1 transmits reply data, and the initiator 14 recognizes that the command is completed. However, since the PIO process 2 retransmits the reply data according to the setting file 4, the initiator 14 receives the second reply data, and detects the fault. In this way, the test program, which is not shown, within the initiator 14 can conduct on the initiator 14 a test of verifying that the initiator 14 can detect the fault upon receipt of the second reply data.

FIGS. 12A through 12D explain file contents and command data, which relate to the operations of the present invention shown in FIG. 11.

FIG. 12A exemplifies the process setting file 29. This exemplifies the contents set in the setting file 4 of the PIO process 2 in the above described S41 of FIG. 11. The following items of information are set as shown in FIG. 12A.
  command: Test Unit Ready
  valid/invalid: valid
  action: control system
  error file name: error_file4

FIG. 12B exemplifies the contents set in the above described error file having the name "error_file4". In this example, the following items of information are set as shown in FIG. 12B.
  timing: when reply data is transmitted
  error contents: retransmits reply data The above described error contents are set in the process setting file 29 and the error setting file 28, so that the PIO process 2 can make the error according to the error contents set in the process setting file 29 and the error setting file 28, namely, the error such that reply data is transmitted twice, occur in response to the command issued from the initiator 14.

FIG. 12C exemplifies an initiator SCSI command. This exemplifies the SCSI command that the initiator 14 issues in the above described step S42 of FIG. 11. The following items of information are set as shown in FIG. 12C.
  command: Test Unit Ready
  contents: 00 00 00 00 00 00

FIG. 12D exemplifies STATUS. This exemplifies the reply data that the pseudo I/O device 1 transmits in the above described steps S43 and S45 of FIG. 11. The following items of information are set as shown in FIG. 12D.
  status: GOOD
  value: 0

Figure 13:
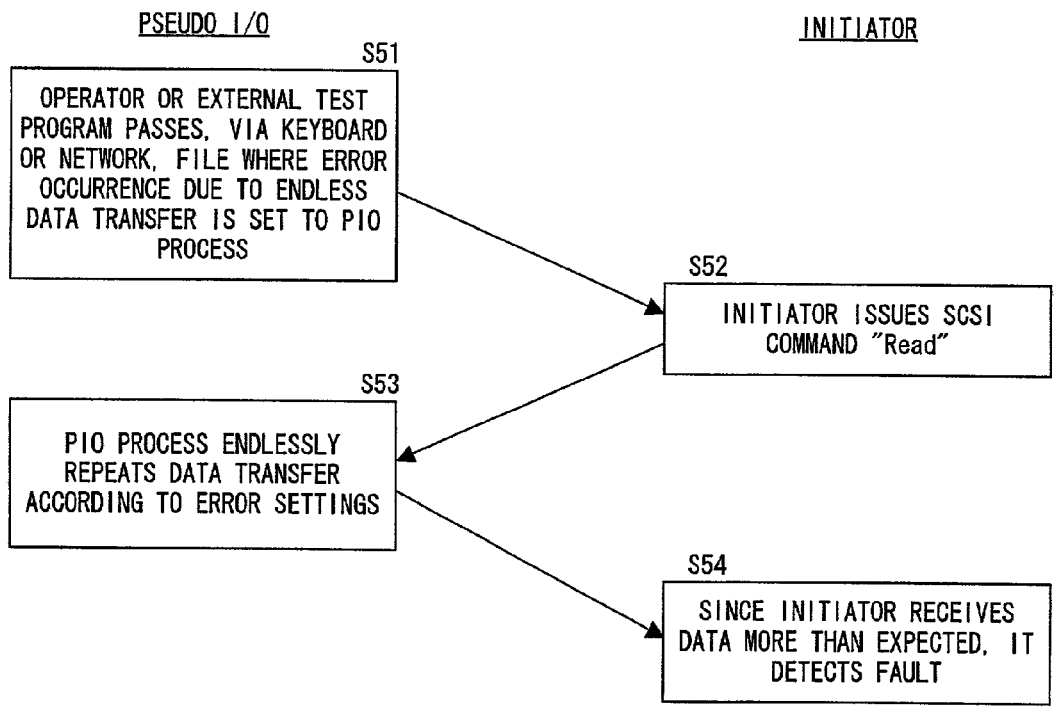
FIG. 13 is a flowchart explaining the operations (No. 6) of the present invention.

FIG. 13 is a flowchart showing the operations (No. 6) of the present invention. This flowchart exemplifies the operations for making an error occur by continuing a data transfer endlessly.

In this figure, in step S51, an operator or an external test program respectively passes, via a keyboard that the operator operates or a network, files where an error occurrence due to "endless data transfer" is set to the PIO process 2. As a result, files shown in FIGS. 14A and 14B to be described later are set as the setting file 4 of the PIO process 2.

In step S52, the initiator issues a SCSI command "Read" (see FIG. 14C).

In step S53, the PIO process endlessly repeats the data transfer according to the error settings. This is a process in which the PIO process 2 endlessly repeats the data transfer according to the error contents (see FIGS. 14A and 14B) set in the setting file in step S51 in response to the SCSI command received via the bus.

In step S54, the initiator detects the fault, since it receives data more than expected.

As described above, after the error contents such that data is transferred endlessly are set in the setting file 4 of the PIO process 2 of the pseudo I/O device 1, the initiator 14 issues a command to the pseudo I/O device 1. Then, the pseudo I/O device 1 transmits data. Since the initiator 14 receives the data more than expected, it detects the fault. In this way, the test program, which is not shown, within the initiator 14 can conduct on the initiator 14 a test of verifying that the initiator 14 can detect a fault upon receipt of data more than expected.

FIGS. 14A through 14C explain file contents and command data, which relate to the operations of the present invention shown in FIG. 13.

FIG. 14A exemplifies the process setting file 29. This exemplifies the contents set in the setting file 4 of the PIO process 2 in the above described step S51 of FIG. 13. In this example, the following items of information are set as shown in FIG. 14A.
  command: Read
  valid/invalid: valid
  action: read system
  error file name: error_file5

FIG. 14B exemplifies the contents set in the above described error file having the name "error_file5". In this example, the following items of information are set as shown in FIG. 14B.
  timing: when data is transferred
  error contents: endlessly transfers data The above described error contents are set in the process setting file 29 and the error setting file 28, so that the PIO process 2 can make the error according to the error contents set in the process setting file 29 and the error setting file 28, namely, the error such that data is transferred endlessly, occur in response to the command issued from the initiator 14.

FIG. 14C exemplifies an initiator SCSI command. This exemplifies the SCSI command that the initiator 14 issues in the above described step S52 of FIG. 13. The following items of information are set as shown in FIG. 14C.
  command: Read
  contents: 28 00 01 23 45 67 00 00 02 00

Figure 15:
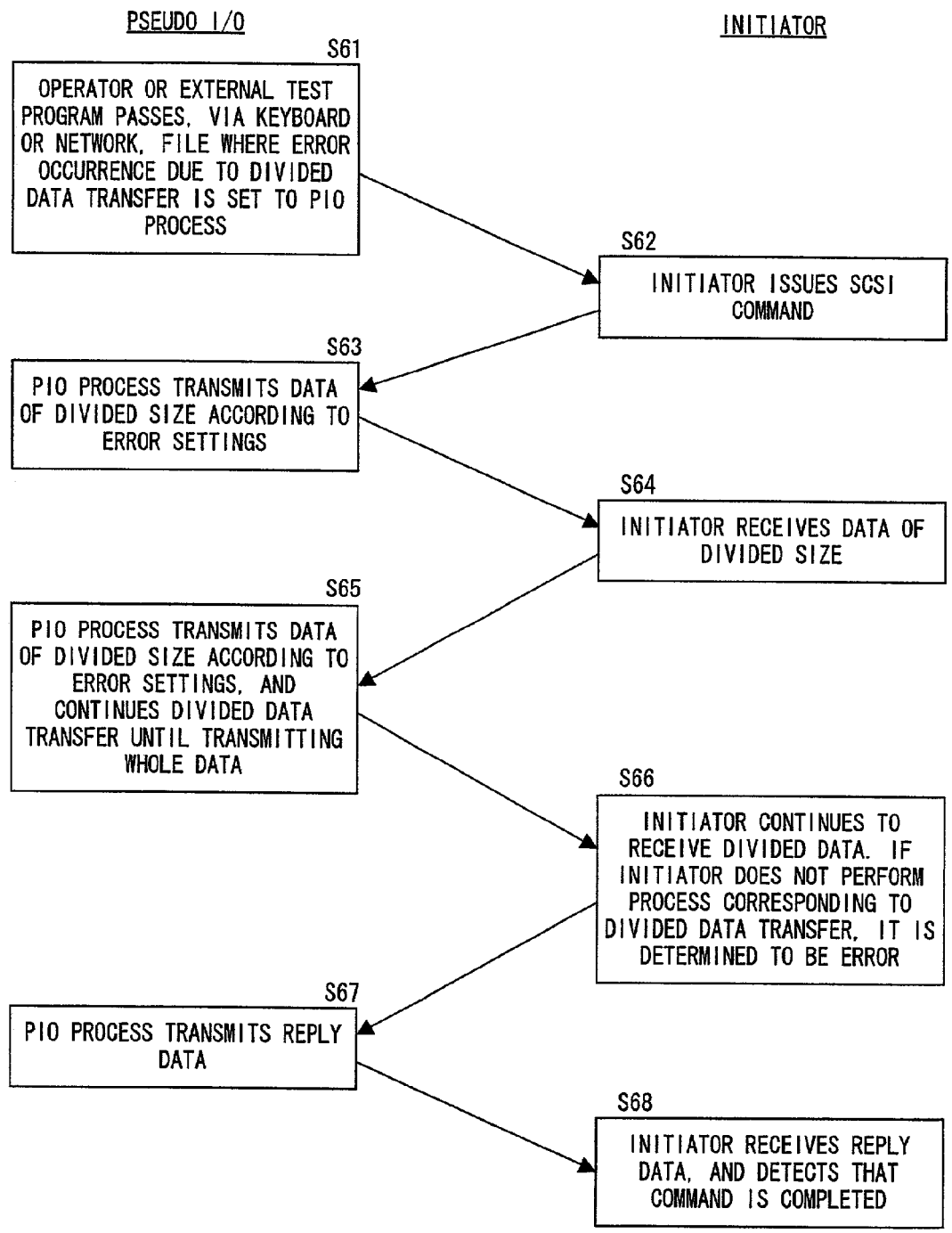
FIG. 15 is a flowchart explaining the operations (No. 7) of the present invention.

FIG. 15 is a flowchart explaining the operations (No. 7) of the present invention. This flowchart exemplifies the operations for making an error occur by making a divided data transfer.

In this figure, in step S61, an operator or an external test program respectively passes, via a keyboard that the operator operates or a network, files where an error occurrence due to "divided data transfer" is set to the PIO process 2. As a result, files shown in FIGS. 16A and 16B to be described later are set as the setting file 4 of the PIO process 2.

In step S62, the initiator issues a SCSI command "Read" (see FIG. 16C).

In step S63, the PIO process transmits data of a divided size according to the error settings. This is a process in which the PIO process 2 transmits data of a divided size according to the error contents (see FIGS. 16A and 16B) set in the setting file in step S61 in response to the SCSI command received via the bus.

In step S64, the initiator receives the divided data.

In step s65, the PIO process further transmits data of a divided size according to the error settings, and continues the divided data transfer until the whole of the data is transmitted.

In step S66, the initiator continues to receive the divided data. If the initiator does not perform a process corresponding to the divided data transfer, it is determined to be an error.

In step S67, the PIO process transmits reply data, since it completes the divided data transfer.

Instep S68, the initiator receives the reply data, and detects that the command is completed.

As described above, after the error contents such that divided data transfer is set in the setting file 4 of the PIO process 2 of the pseudo I/O device 1, the initiator 14 issues a command to the pseudo I/O device 1. Then, the initiator 14 sequentially receives the divided data, and receives reply data upon termination of the divided data transfer. If the initiator does not perform a corresponding process for the divided data transfer, it is determined to be an error. If the initiator performs a corresponding process, it is determined to be normal. In this way, the test program, which is not shown, within the initiator 14 can conduct on the initiator 14 a test of determining whether or not the initiator 14 performs a process for divided data reception.

FIGS. 16A through 16C explain file contents and command data, which relate to the operations of the present invention shown in FIG. 15.

FIG. 16A exemplifies the process setting file 29. This exemplifies the contents set in the setting file 4 of the PIO process 2 in the above described step S61 of FIG. 15. The following items of information are set as shown in FIG. 16A.
  command: Read
  valid/invalid: valid
  action: read system
  error file name: error_file6

FIG. 16B exemplifies the contents set in the above described error file having the name "error_file6". In this example, the following items of information are set as shown in FIG. 16B.
  timing: when data is transferred
  error contents: makes divided data transfer in units of 0x200 bytes The above described error contents are set in the process setting file 29 and the error setting file 28, so that the PIO process 2 can perform a process according to the error contents set in the process setting file 29 and the error setting file 28, namely, the process for transferring divided data, in response to the command issued from the initiator 14. In this way, a test of determining whether or not the initiator 14 performs a process corresponding to the divided data transfer can be conducted on the initiator.

FIG. 16C exemplifies an initiator SCSI command. This exemplifies the SCSI command that the initiator 14 issues in the above described step S62 of FIG. 15. The following items of information are set as shown in FIG. 16C.
  command: Read
  contents: 28 00 01 23 45 67 00 80 0a 80

FIG. 17 is a flowchart showing the operations (No. 8) of the present invention. This flowchart exemplifies the operations for making an error occur by changing a data transfer length (size).

In this figure, in step S71, an operator or an external test program respectively passes, via a keyboard that the operator operates or a network, files where an error occurrence due to "change in data transfer length" is set to the PIO process 2. As a result, files shown in FIGS. 18A and 18B to be described later are set as the setting file 4 of the PIO process 2.

In step S72, the initiator issues a SCSI command "Read" (see FIG. 18C).

In step S73, the PIO process transmits data of a size set in the error settings. This is a process in which the PIO process 2 transmits data of a set size according to the contents (see FIGS. 18A and 18B) set in the setting file 4 in response to the SCSI command received via the bus.

In step S74, the initiator receives data of a size that is different from an expected size.

In step S75, the PIO process transmits reply data.

In step S76, the initiator recognizes that the command is completed, and performs a process for the case where a data size is different.

As described above, after the error contents such that a data transfer length is changed are set in the setting file 4 of the PIO process 2 of the pseudo I/O device 1, the initiator 14 issues a command to the pseudo I/O device 1. The initiator 14 receives data, and further receives reply data upon termination of the data transfer. Then, the initiator detects that the data size is different, and performs a process for the case where data of a different size is received. In this way, the test program, which is not shown, within the initiator 14 can conduct on the initiator 14 a test of determining whether or not the initiator 14 can perform a process for the case where a data transfer length is changed.

FIGS. 18A through 18D explain file contents and command data, which relate to the operations of the present invention shown in FIG. 17.

FIG. 18A exemplifies the process setting file 29. This exemplifies the contents set in the setting file 4 of the PIO process 2 in the above described step S71 of FIG. 17. The following items of information are set as shown in FIG. 18A.
  command: Read
  valid/invalid: valid
  action: read system
  error file name: error_file7

FIG. 18B exemplifies the contents set in the above described error file having the name "error_file7". In this example, the following items of information are set as shown in FIG. 18.
  timing: when data is transferred
  error contents: changes data transfer size to 0x200 bytes The above described error contents are set in the process setting file 29 and the error setting file 28, so that the PIO process 2 performs a process according to the error contents set in the process setting file 29 and the error setting file 28, namely, the process for changing a data length and for transferring data, in response to the command issued from the initiator 14. In this way, a test of determining whether or not the initiator 14 performs a process corresponding to a change in a data transfer length can be conducted on the initiator 14.

FIG. 18C exemplifies an initiator SCSI command. This exemplifies the SCSI command that the initiator 14 issues in the above described step S72 of FIG. 17. The following items of information are set as shown in FIG. 18C.

command: Read
contents: 28 00 01 23 45 67 00 00 0a 00

FIG. 18D exemplifies STATUS. This exemplifies the reply data that the pseudo I/O device 1 transmits in the above described step S75 of FIG. 17. The following items of information are set as shown in FIG. 18D.

status: GOOD
value: 0

Figure 19:
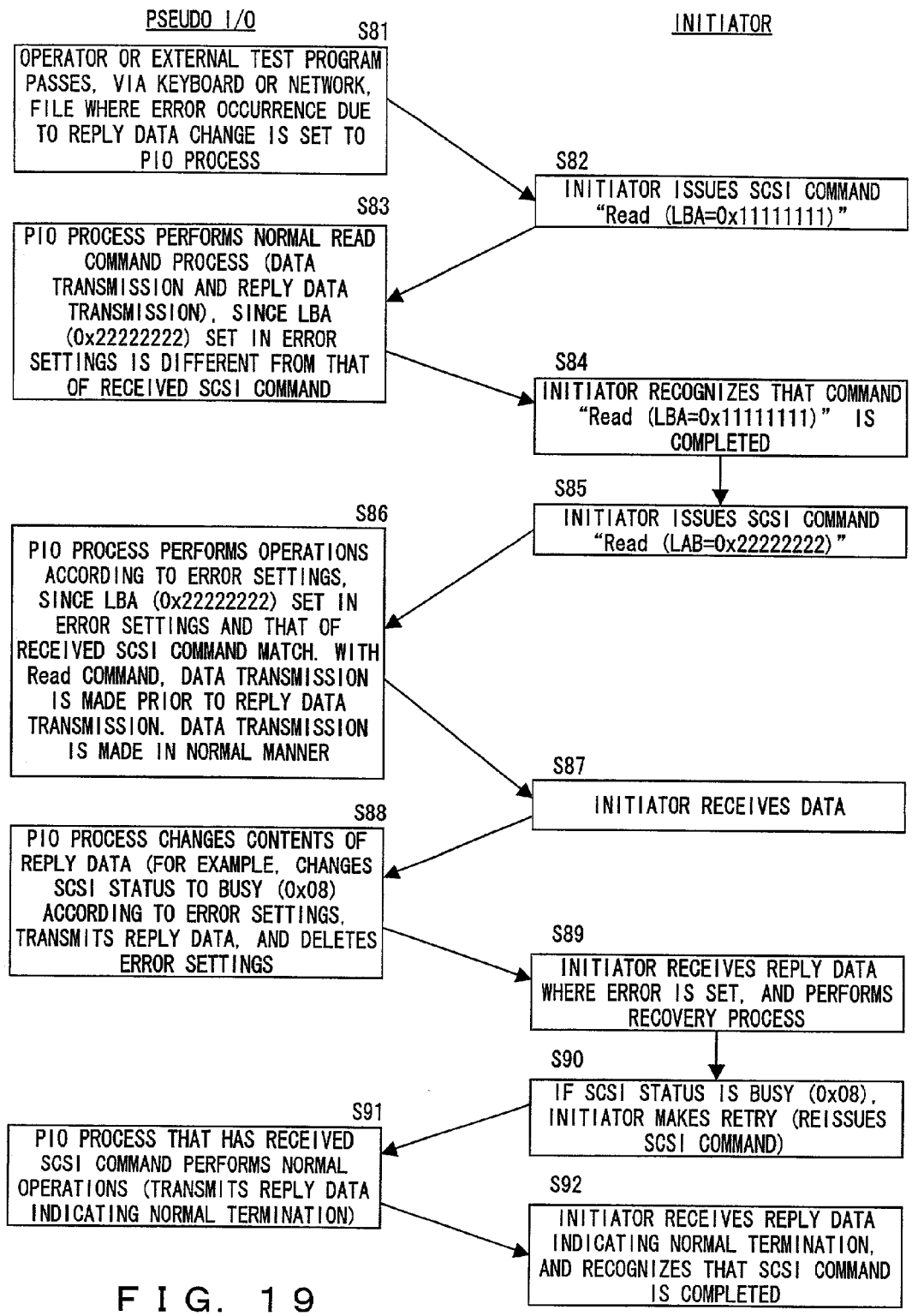
FIG. 19 is a flowchart explaining the operations (No. 9) of the present invention.

FIG. 19 is a flowchart showing the operations (No. 9) of the present invention. This flowchart exemplifies the operations for making an error occur at a variation (No.1) of error occurrence timing in the PIO process 2.

In this figure, in step S81, an operator or an external test program passes, respectively via a keyboard that the operator operates or a network, files where an error occurrence due to "change in reply data" is set to the PIO process 2. As a result, files shown in FIGS. 20A and 20B to be described later are set as the setting file 4 of the PIO process 2.

In step S82, the initiator issues a SCSI command "Read (LBA=0x11111111)".

In step S83, the PIO process performs a normal Read command process (data transmission and reply data transmission), because the LBA (=0x22222222) set in the error setting file is different from that of the received SCSI command. This is a process in which the PIO process 2 performs not an error process but the normal Read command process (data transmission and reply data transmission) in response to the SCSI command received via the bus, since the LBA of the received command is different from that in the contents (LBA=0x22222222) set in the setting file 4 (see FIGS. 20A and 20B).

In step S84, the initiator recognizes that the process of the SCSI command Read (LBA=0x11111111) is completed.

In step S85, the initiator issues a SCSI command "Read" (LBA=0x22222222).

In step S86, the PIO process performs an operation according to the error settings, because the LBA (=0x22222222) set in the error setting file and that of the received SCSI command match. With the Read command, data transmission is made prior to reply data transmission. The data transmission is made in a normal manner.

In step S87, the initiator receives the data.

In step S88, the PIO process changes the contents of the reply data (for example, changes SCSI STATUS to BUSY (0x08)) according to the contents set in the error setting file, and transmits the reply data. The PIO process then deletes the error settings.

In step S89, the initiator receives the reply data where the error is set, and perform a recovery process for the received data where the error is set.

In step S90, if the received reply data includes SCSI STATUS=BUSY (0x08), the initiator makes a retry (reissues the SCSI command) as the recovery process.

In step S91, the PIO process that has received the SCSI command performs a normal operation (transmits reply data indicating normal termination).

In step S92, the initiator receives the reply indicating the normal termination, and recognizes that the SCSI command is completed.

As described above, after the error contents (change in reply data) are set in the setting file 4 of the PIO process 2 of the pseudo I/O device 1, the initiator 14 issues a command to the pseudo I/O device 1. The pseudo I/O device 1 changes reply data if the command matches the contents set in the setting file 4, and transmits the reply data. Then, the initiator 14 reissues the command as a recovery process. In this way, the test program, which is not shown, within the initiator 14 can conduct on the initiator 14 a test of determining whether or not the initiator 14 can properly perform a process for the case where reply data is changed.

FIG. 20 explains file contents and command data, which relate to the operations of the present invention shown in FIG. 19.

FIG. 20A exemplifies the process setting file 29. This exemplifies the contents set in the setting file 4 of the PIO process 2 in the above described step S81 of FIG. 19. The following items of information are set as shown in FIG. 20A.

command: Read
valid/invalid: valid
action: read system
error file name: error_file8 if LBA=0x22222222

FIG. 20B exemplifies the contents set in the above described error file having the name "error_file8". In this example, the following items of information are set as shown in FIG. 20B.

timing: when reply data is returned
error contents: change in reply data (ex: changes from GOOD (0x00) to BUSY (0x08))

The above described error contents are set in the process setting file 29 and the error setting file 28, so that the PIO process 2 can perform a process (reply data change) according to the error contents set in the process setting file 29 and the error setting file 28 in response to the command issued from the initiator 14. In this way, a test of determining whether or not the initiator 14 performs a process corresponding to the reply data change can be conducted.

FIG. 20C exemplifies an initiator SCSI command. This exemplifies the SCSI command that the initiator 14 issues in the above described step S82 of FIG. 19. Items of information are set as shown in FIG. 20C.

FIG. 20D exemplifies STATUS. This exemplifies the reply data that the pseudo I/O device 1 transmits in the above described steps S88 and S91 of FIG. 19.

Figure 21:
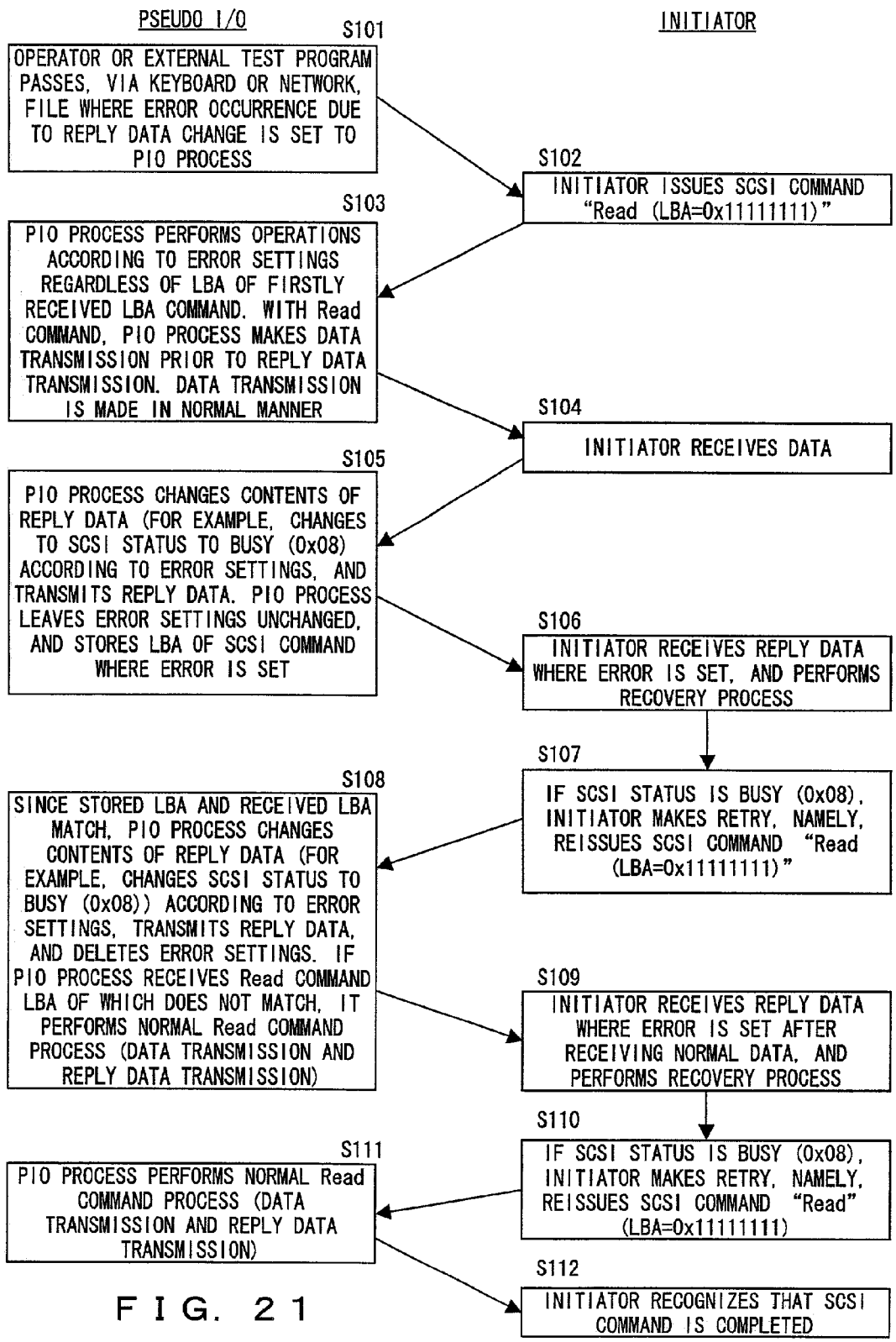
FIG. 21 is a flowchart explaining the operations (No. 10) of the present invention.

FIG. 21 is a flowchart showing the operations (No. 10) of the present invention. This flowchart exemplifies the operations for making an error occur at a variation (No.2) of error occurrence timing in the PIO process.

In this figure, in step S101, an operator or an external test program passes, respectively via a keyboard that the operator operates or a network, files where an error occurrence due to "reply data change" is set to the PIO process 2. As a result, files shown in FIGS. 22A and 22B to be described later are set as the setting file 4 of the PIO process 2.

In step S102, the initiator issues a SCSI command "Read (LBA=0x11111111)".

In step S103, the PIO process performs an operation according to the contents set in the setting file 4 regardless of the setting of the LBA of the firstly received SCSI command. For example, with the Read command, the PIO process makes data transmission prior to reply data transmission. This data transmission is made in a normal manner.

In step S104, the initiator receives the data.

Instep S105, the PIO process changes the contents of the reply data (for example, changes SCSI STATUS to BUSY (0x08)) according to the error contents set in the setting file 4, and transmits the reply data. The PIO process leaves the set error contents unchanged, and stores the LBA (0x11111111 in this case) of the SCSI command where the error is set.

In step S106, the initiator receives the reply data where the error is set, and performs a recovery process for the reply data.

In step S107, if the received reply data includes SCSI STATUS=BUSY (0x08), the initiator makes a retry (reissues the SCSI command) as the recovery process. Namely, the initiator reissues the Read command (LBA=0x11111111).

In step S108, since the stored LBA and the receives LBA match, the PIO process changes the contents of the reply data (for example, changes SCSI STATUS to BUSY (0x08) according to the set error contents, and deletes the set error contents after transmitting the changed reply data. If the PIO process receives a Read command the LBA of which does not match, it performs a normal Read command process (data transmission and reply data transmission).

In step S109, the initiator receives the reply data where the error is set after receiving normal data, and performs a recover operation for the reply data.

In step S110, for example, if the reply data includes SCSI STATUS=BUSY (0x08), the initiator makes a retry (reissues the SCSI command) as the recovery process. Namely, the initiator reissues the Read (LBA=0x11111111) command.

In step S111, the PIO process performs the normal Read command process (data transmission and reply data transmission).

In step S112, the initiator recognizes that the SCSI command is completed.

As described above, after the error contents (reply data change) are set in the setting file 4 of the PIO process 2 of the pseudo I/O device 1, the initiator 14 issues a command to the pseudo I/O device 1. With the operations of step S103 through step S112, the test program, which is not shown, within the initiator 14 can conduct on the initiator 14 a test of determining whether or not the initiator 14 can properly perform a process for the case where reply data is changed.

FIG. 22 explains file contents and command data, which relate to the operations of the present invention shown in FIG. 21.

FIG. 22A exemplifies the process setting file 29. This exemplifies the contents set in the setting file 4 of the PIO process 2 in the above described step S101 of FIG. 21. The following items of information are set as shown in FIG. 22A.
command: Read
valid/invalid: valid
action: read system
retry error: exists
error file name: error_file9 if LBA=0x22222222

Unlike the case shown in FIG. 20A, the process setting file shown in FIG. 22A has the setting item of "retry error", and its content is "exists" for the above described "LBA=0x22222222". Therefore, the process transfers to the execution of the contents of the error setting file regardless of whether or not the LBA is 0x22222222.

FIG. 22B exemplifies the contents set in the above described error file having the name "error_file9".

In this example, the following items of information are set as shown in FIG. 22B.
timing: when reply data is returned
error contents: changes reply data (ex: changes from GOOD (0x00) to BUSY (0x08))

The above described error contents are set in the process setting file 29 and the error setting file 28, so that the PIO process 2 performs a process (reply data change) according to the contents set in the process setting file 29 and the error setting file 28 in response to the command issued from the initiator 14 to the pseudo I/O process 1. In this way, a test of determining whether or not the initiator 14 can properly perform a process corresponding to the reply data change can be conducted on the initiator 14.

FIG. 22C exemplifies an initiator SCSI command. This exemplifies the SCSI command that the initiator 14 issues in the above described step S102 of FIG. 21. Items of information are set as shown in FIG. 22C.

FIG. 22D exemplifies STATUS. This exemplifies the reply data that the pseudo I/O device 1 transmits in the above described steps S108 and S111 of FIG. 21.

FIG. 23 is flowcharts showing the operations (No. 11) of the present invention. These flowcharts exemplify the operations for making an error occur at a driver level.

In 23A, in step S121, an operator or an external test program passes, respectively via a keyboard or a network, files where a hardware error occurrence is set to the PIO process 2. As a result, the hardware error occurrence is set in the setting file 4 of the PIO process 2.

In step S122, the initiator issues a SCSI command.

In step S123, the initiator and the pseudo I/O device 1 exchange data based on the SCSI protocol.

In step S124, the PIO process instructs the driver to make the error occur at specified error occurrence timing.

In step S125, the driver performs an error occurrence process.

As described above, after the hardware error occurrence is set in the setting file 4 of the PIO process 2 of the pseudo I/O device 1, the initiator 14 issues a command to the pseudo I/O device 1. The PIO process 2 instructs the driver to make the error occur at the timing set in the setting file 4 while data is exchanged between the initiator 14 and the pseudo I/O device 1. The initiator 14 then recognizes the hardware error, and performs a corresponding process.

In this way, the test program, which is not shown, within the initiator 14 can conduct on the initiator 14 a test of determining whether or not the initiator 14 can detect a hardware error occurrence of the pseudo I/O device 1, and can properly perform a process corresponding to the hardware error occurrence.

Figures 23A, 23B:
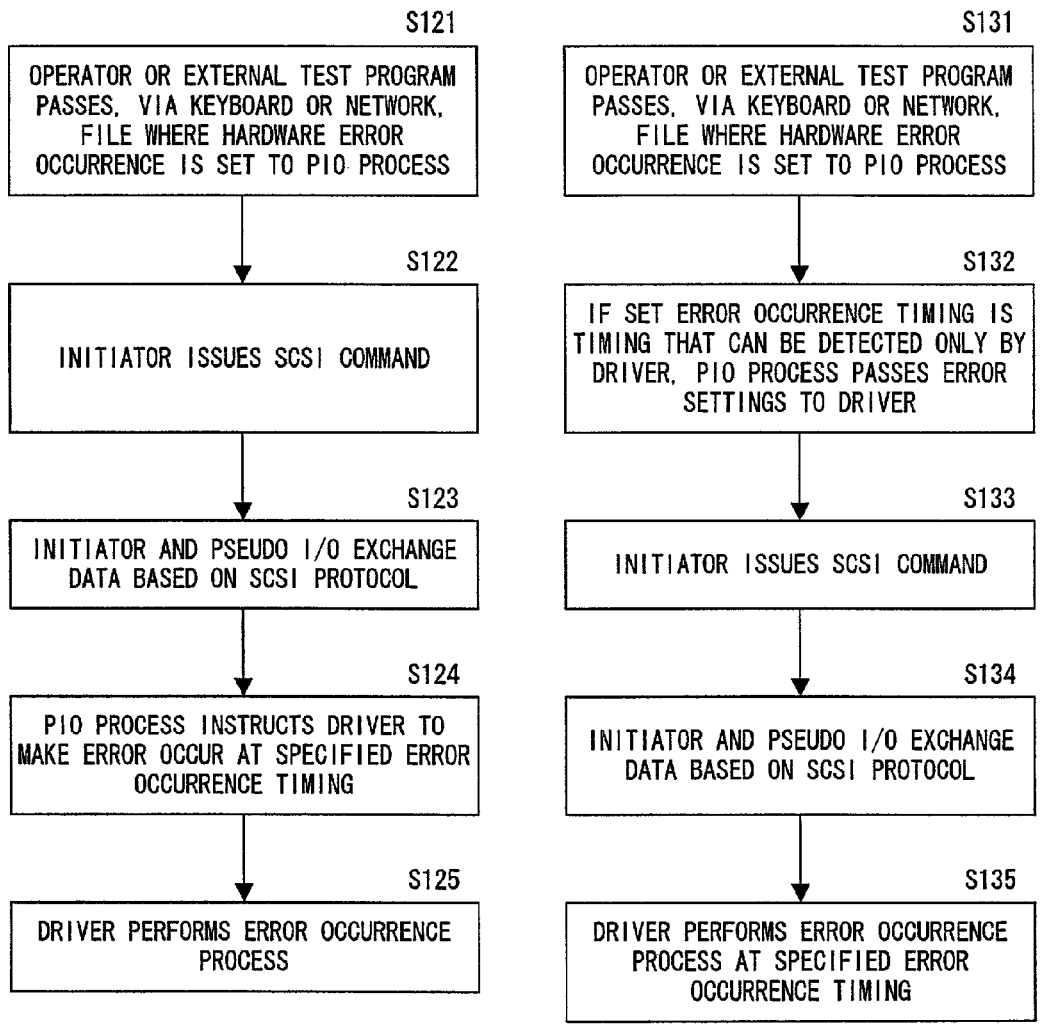
FIG. 23 is flowcharts explaining the operations (No. 11) of the present invention.

In FIG. 23B, in step S131, an operator or an external test program passes, respectively via a keyboard or a network, files where a hardware error occurrence is set to the PIO process 2. As a result, the hardware error occurrence is set in the setting file 4 of the PIO process 2.

In step S132, if the set error occurrence timing is timing that can be detected only by the driver, the PIO process passes the error settings to the driver.

In step S133, the initiator issues a SCSI command.

In step S134, the initiator and the pseudo I/O device 1 exchange data based on the SCSI protocol.

In step S135, the driver performs an error occurrence process at the specified error occurrence timing.

As described above, the contents of hardware error occurrence set in the setting file 4 of the PIO process 2 are passed to the driver. The initiator 14 issues a command. Then, the driver makes the error occur upon detection of the timing set in the setting file 4 while data is exchanged between the initiator 14 and the pseudo I/O device 1. The initiator 14 recognizes the hardware error, and performs a corresponding process. In this way, the test program, which is not shown, within the initiator 14 can conduct on the initiator 14 a test of determining whether or not the initiator 14 can detect a hardware error occurrence of the pseudo I/O device 1, and can properly perform a process corresponding to the hardware error occurrence.

Figure 24:
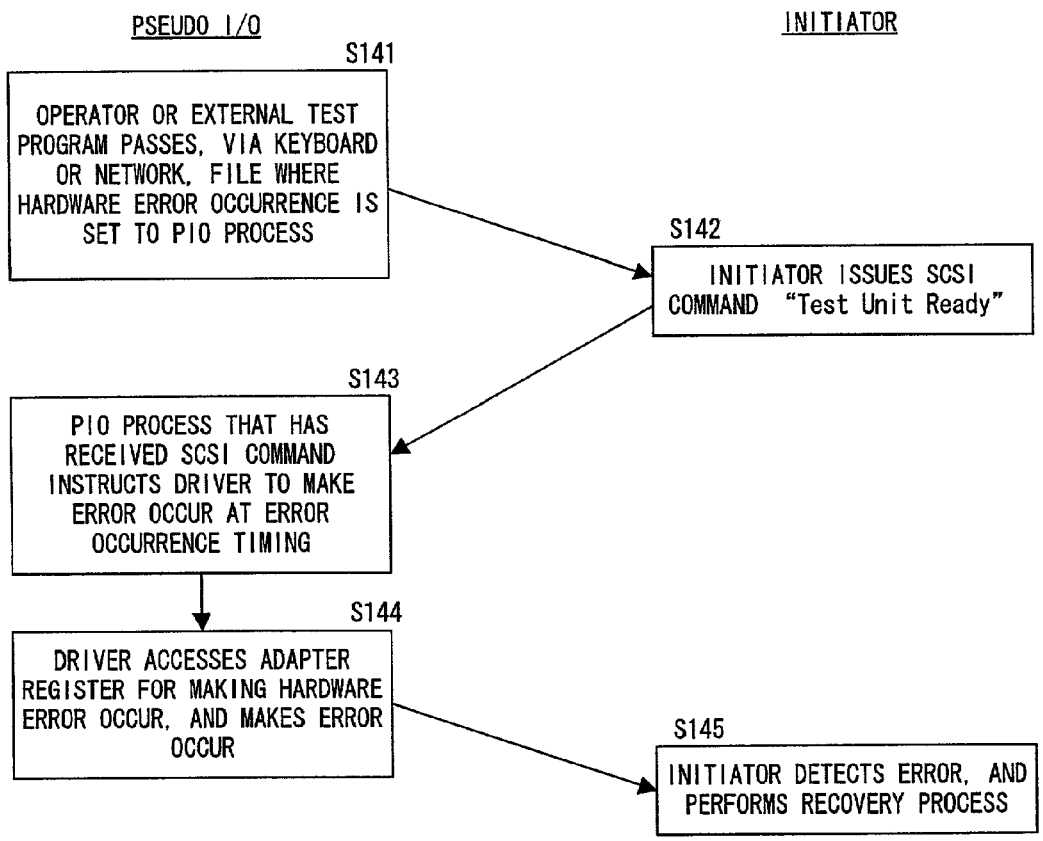
FIG. 24 is a flowchart explaining the operations (No. 12) of the present invention.

FIG. 24 is a flowchart explaining the operations (No. 12) of the present invention. This flowchart exemplifies the operations for making an error occur by invoking a hardware error occurrence capability prepared by the adapter.

In this figure, in step S141, an operator or an external test program passes, respectively via a keyboard or a network, files where a hardware error occurrence is set to the PIO process 2. As a result, files shown in FIGS. 25A and 25B to be described later are set as the setting file 4 of the PIO process 2.

In step S142, the initiator issues a SCSI command "Test Unit Ready".

In step S143, the PIO process 2 that has received the SCSI command instructs the driver to make the error occur at error occurrence timing.

In step S144, the driver accesses an adapter register for making a hardware error occur, and makes the error occur.

In step S145, the initiator detects the error, and performs a recovery process.

As described above, after the error contents (hardware error occurrence) are set in the setting file 4 of the PIO process 2 of the pseudo I/O device 1, the initiator 14 issues a command. The PIO process 2 makes the error occur upon detection of set timing. The initiator 14 then detects this hardware error occurrence, and performs a recovery process. In this way, the test program, which is not shown, within the initiator 14 can conduct on the initiator 14 a test of determining whether or not the initiator 14 can detect a hardware error when the error occurs in the pseudo I/O device 1, and can perform a recovery process.

Figures 25A, 25B, 25C, 25D, 25E:
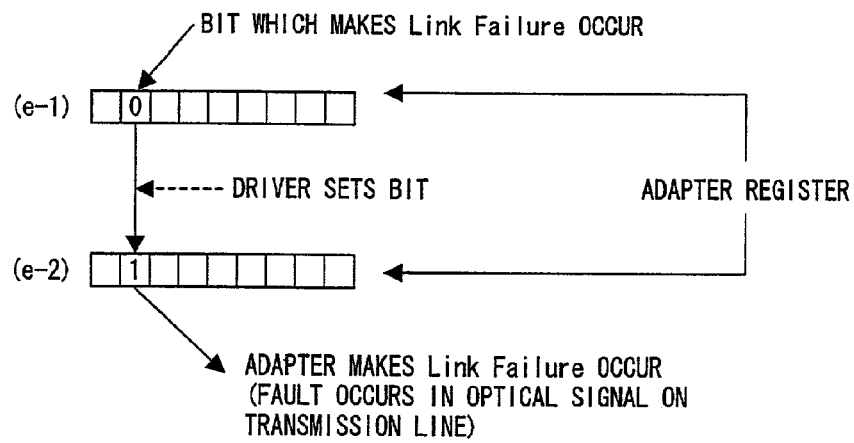
FIGS. 25A through 25D explain file contents and command data, which relate to the operations of the present invention shown in FIG. 24.
FIG. 25E explains an adapter error occurrence.

FIGS. 25A through 25D explain file contents and command data, which relate to the operations of the present invention shown in FIG. 24, and FIG. 25E explains an error occurrence of the adapter.

FIG. 25A exemplifies the process setting file 29. This exemplifies the contents set in the setting file 4 of the PIO process 2 in the above described step S141 of FIG. 24. Here, the following items of information are set as shown in FIG. 25A.

command: Test Unit Ready
valid/invalid: valid
action: control system
error file name: error_file10

FIG. 25B exemplifies the contents set in the above described error file having the name "error_file10". Here, the following items of information are set as shown in FIG. 25B.

timing: when reply data is returned
error contents: makes a fault occur in a signal transmitted over a cable (ex: makes Link Failure occur)

The above described error contents are set in the process setting file 29 and the error setting file 28, so that the error (hardware error such as Link Failure) according to the contents set in the process setting file 29 and the error setting file 28 is made to occur at error occurrence timing. In this way, a test of determining whether or not the initiator 14 can detect a hardware error, and can properly perform a recovery process can be conducted on the initiator 14.

FIG. 25C exemplifies an initiator SCSI command. This exemplifies the SCSI command that the initiator 14 issues in the above described step S142 of FIG. 24. In this example, the following items of information are set as shown in FIG. 25C.

FIG. 25D exemplifies STATUS. This exemplifies the reply data that the pseudo I/O device 1 transmits, for example, in the above described step S144 of FIG. 24. This exemplifies an error occurrence due to a register access as shown in FIG. 25E.

(e-1) in FIG. 25E shows the state where 0 (which does not make an error occur) is set in a position of a bit that makes Link Failure occur in an adapter register. This is a state where the adapter 7 shown in FIG. 2 is made not to let the hardware error "Link Failure" occur.

(e-2) in FIG. 25E shows the state where 1 (which makes an error occur) is set in the position of the bit that makes Link Failure occur in the adapter register. This is a state where the adapter 7 shown in FIG. 2 is made to let the hardware error "Link Failure" occur, and the link fault occurs in the bus shown in FIG. 2. In this way, the hardware error in the above described step S144 of FIG. 24 can be made to occur.

Figure 26:
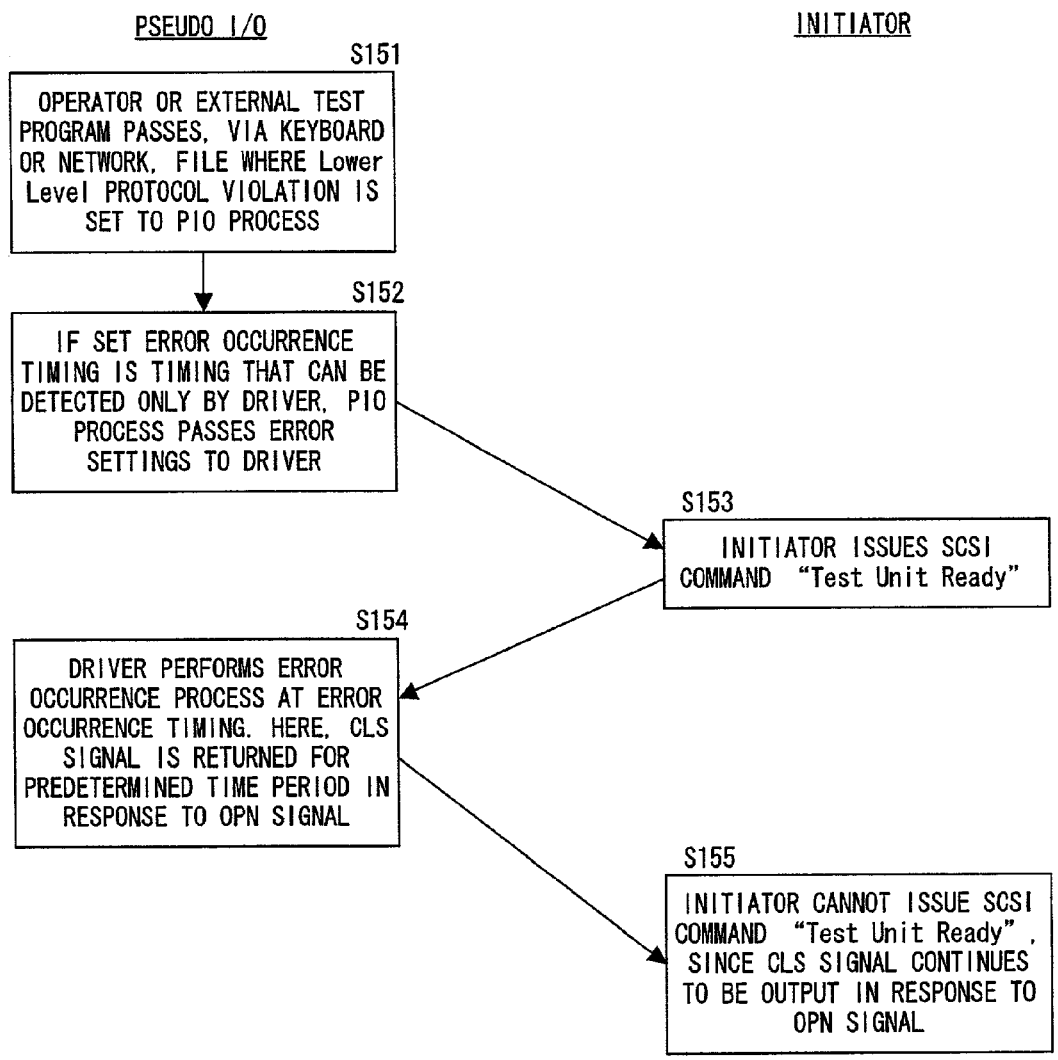
FIG. 26 is a flowchart explaining the operations (No. 13) of the present invention.

FIG. 26 is a flowchart explaining the operations (No. 13) of the present invention. This flowchart exemplifies the operations for making an error occur due to a Lower Level protocol violation (No. 1).

In this figure, in step S151, an operator or an external test program passes, respectively via a keyboard or a network, a file where the Lower Level protocol violation is set to the PIO process 2. As a result, a file shown in FIG. 27A to be described later is set as the setting file 4 of the PIO process 2.

In step S152, if set error occurrence timing is timing that can be detected only by the driver, the PIO process passes the error settings to the driver.

In step S153, the initiator issues a SCSI command "Test Unit Ready".

In step S154, the driver performs an error occurrence process at the set error occurrence timing. In this example, a CLS signal is returned for a predetermined time period in response to an OPN signal.

In step S155, the initiator cannot issue the SCSI command "Test Unit Ready", since the CLS signal continues to be output in response to the OPN signal. Therefore, a timeout occurs.

As described above, after the error contents (Lower Level protocol violation) are set in the setting file 4 of the PIO process 2 of the pseudo I/O device 1, the initiator 14 cannot issue the command (Test Unit Ready) despite attempting to issue the command. This is because the CLS signal according to the error settings continues to be output from the driver in response to the OPN signal. The initiator then recognizes that the timeout occurs. In this way, the test program, which is not shown, within the initiator 14 can conduct on the initiator 14 a test of determining whether or not the initiator 14 can perform a process corresponding to an error, namely, whether or not the initiator 14 cannot issue the command due to an occurrence of the protocol violation in the pseudo I/O device 1.

FIG. 27 explains file contents and command data, which relate to the operations of the present invention shown in FIG. 26.

FIG. 27A exemplifies a LINK error setting file 26. This exemplifies the contents set in the setting file 4 of the PIO process 2 in the above described step S151 of FIG. 26. In this example, the following items of information are set as shown in FIG. 27A.

timing: when an OPN signal is received
error contents: transmits a CLS signal for one minute FIG. 27B exemplifies an initiator SCSI command. This exemplifies the SCSI command that the initiator 14 issues in the above described step S153 of FIG. 26. In this example, items of information shown in FIG. 27B are set.

Figure 28:
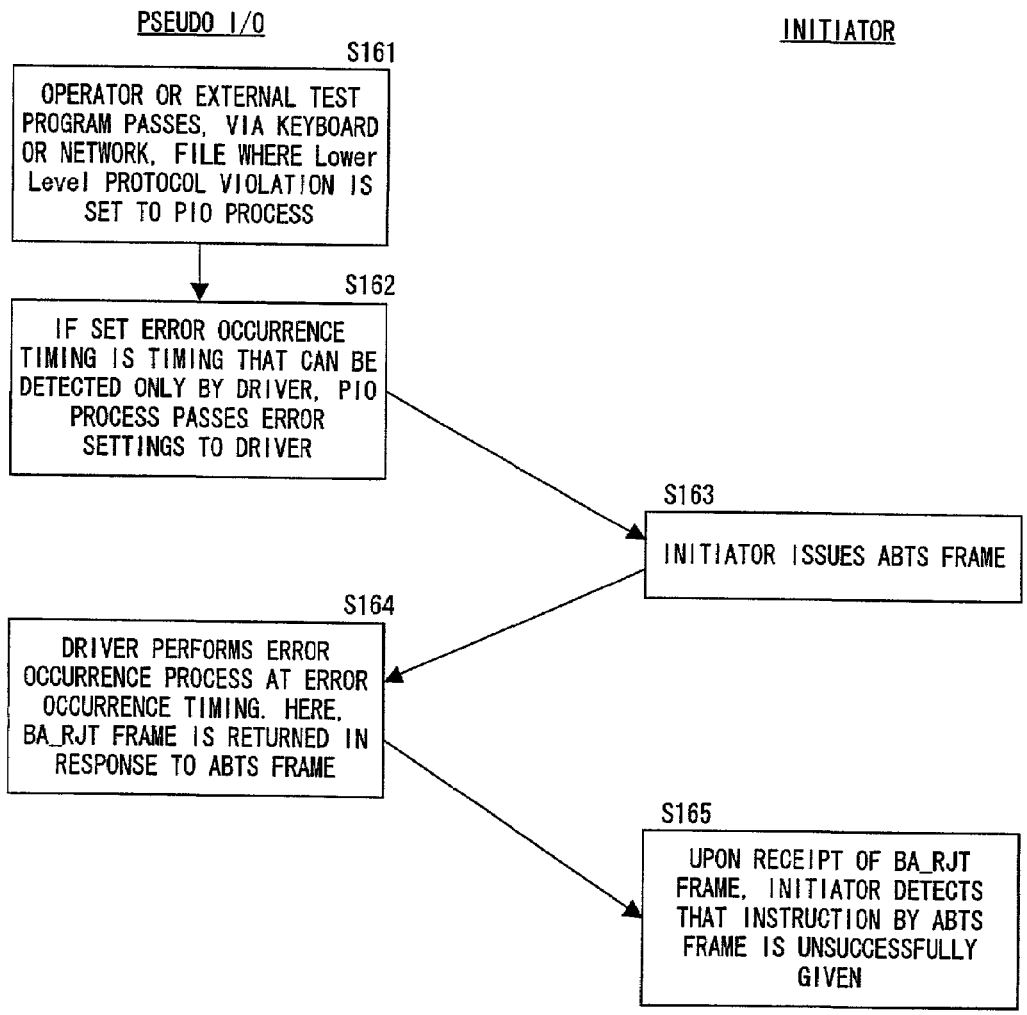
FIG. 28 is a flowchart explaining the operations (No. 14) of the present invention.

FIG. 28 is a flowchart explaining the operations (No. 14) of the present invention. This flowchart exemplifies the operations for making an error occur due to a Lower Level protocol violation (No. 2).

In this figure, in step S161, an operator or an external test program passes, respectively via a keyboard or a network, a file where the Lower Level protocol violation is set to the PIO process 2. As a result, a file shown in FIG. 29A to be described later is set as the setting file 4 of the PIO process 2.

In step S162, if set error occurrence timing is timing that can be detected only by the driver, the PIO process passes the error settings to the driver.

In step S163, the initiator issues an ABTS frame.

In step S164, the driver performs an error occurrence process at the set error occurrence timing. Here, a BA_RJT frame is returned in response to the ABTS frame.

In step S165, upon receipt of the BA_RJT frame, the initiator detects that the instruction by the ABTS frame is unsuccessfully given.

As described above, after the error contents (Lower Level protocol violation) are set in the setting file 4 of the PIO process 2 of the pseudo I/O device 1, the initiator issues a command, and detects the error with the operations of steps S164 and S165. In this way, the test program, which is not shown, within the initiator 14 can conduct on the initiator 14 a test of determining whether or not the initiator 14 can detect an error occurrence due to a protocol violation in the pseudo I/O device 1, and can perform a process corresponding to the error occurrence.

FIG. 29 explains file contents and command data, which relate to the operations of the present invention shown in FIG. 28.

FIG. 29A exemplifies the LINK error setting file 26. This exemplifies the contents set in the setting file 4 of the PIO process 2 in the above described step S161 of FIG. 28. In this example, the following items of information are set as shown in FIG. 29A.

timing: when an ABTS frame is received
error contents: transmits a BA_RJT frame

FIG. 29B exemplifies an initiator SCSI command. This exemplifies the SCSI command that the initiator 14 issues in the above described step S163 of FIG. 28. In this example, items of information shown in FIG. 29B are set.

FIGS. 30A and 30B exemplify the settings of an error file for a magnetic disk device, according to the present invention. These figures exemplify the settings for simulating similar target devices of diverse types by changing the process setting file 29. By validating or invalidating a command specific to a device, a SCSI command process of a target device can be simulated.

FIG. 30A exemplifies the settings of the process setting file for a magnetic disk device. In the file for a magnetic disk device, the following commands are set to be valid as shown in FIG. 30A.

Test Unit Ready
Seek
others

FIG. 30B exemplifies the settings of the process setting file for a magnetic tape device. In the file for a magnetic tape device, the following commands are set to be valid as shown in FIG. 30B.

Test Unit Ready
Erase
others

By setting a command, which is used by an I/O device to be simulated, to be valid among the commands in the process setting file 29 as described above, the process setting file 29 for the corresponding I/O device can be generated.

FIGS. 31A and 31B exemplify the settings of an error schedule file according to the present invention. These figures exemplify an error schedule file 30. Here, information items such as a setting type, a command, LUN, and setting contents are set as shown in FIGS. 31A and 31B.

FIG. 31A shows an example where a plurality of error schedules (schedule00) are collectively set in the error schedule file 30. Here, the PIO process collectively reads from the first setting to setting completion, and further from the setting succeeding the setting completion to the next setting completion, so that errors are sequentially made to occur.

FIG. 41B shows an example of the error schedule file 30 (schedule01) including a series of error schedules, which is read by the PIO process.

By setting error schedules in the error schedule file 30 and by sequentially executing the schedules as described above, error processes the number of which is equal to that of set commands are automatically and sequentially executed in a similar manner as in the single error process explained with reference to FIGS. 2 through 30.

With the above described pseudo I/O system and method according to the present invention, a device to be tested can be made to run by arbitrarily setting error contents that are the same as those of data in actual use, whereby a system that can be configured at low cost, and can conduct a test while making a device to be tested perform the same operations as those of an actual device in use.

In the above provided explanation of the pseudo I/O system and method according to the present invention, the test program which is not shown and makes a device to be simulated run is installed within the initiator 14, and an operator or an external test program passes, respectively via a keyboard that the operator operates or a network, a file where error contents are set to the PIO process. However, the present invention is not limited to this implementation. An external test program may not only pass a file where error contents are set to the PIO process, but also set desired data in the setting file 4 of the PIO process 2 via a network and makes the initiator 14 run for a test.

Such an implementation only requires that a device in which an external test program is installed is prepared and connected to a network, thereby eliminating the need for installing a test program in the initiator 14 beforehand. Note that the test program referred to in this specification is an application program running on an OS.

Additionally, the pseudo I/O system and method according to the present invention can be effectively applied to an operation test conducted on various types of devices, an analyzer, a driver of an actual device, a driver installed on an OS, a RAID controller controlling a RAID device, etc.

What is claimed is:

1. A pseudo I/O device for use in a pseudo I/O system that is connected with a device to be tested, and simulates an actual I/O system, comprising:

a setting unit receiving a file where contents of an error of a pseudo target are defined and set and setting the file as a setting file, the contents of the file being used to process commands from various types of devices including devices of a different type than the device to be tested;

a receiving unit receiving a command from the device to be tested;

a pseudo I/O unit processing the command received by said receiving unit according to set contents when the contents corresponding to the command are set when referencing the setting file, and performing a normal reply process when the contents corresponding to the command are not set; and a transmitting unit returning data after being processed to the device to be tested at a request source, where only one pseudo I/O unit is provided in the pseudo I/O system.

2. The pseudo I/O device according to claim 1, wherein a file where information of an I/O device to be simulated is defined and set is set as the setting file.

3. A pseudo I/O device for use in a pseudo I/O system that is connected with a device to be tested, and simulates an actual I/O system, comprising:

a setting unit receiving a file where contents of an error of a pseudo target are defined and set and setting the file as a setting file, the contents of the file being changeable to accommodate various types of devices;

a receiving unit receiving a command from the device to be tested;

a pseudo I/O unit processing the command received by said receiving unit according to set contents when the contents corresponding to the command are set when referencing the setting file, and performing a normal reply process when the contents corresponding to the command are not set;

a transmitting unit returning data after being processed to the device to be tested at a request source, where only one pseudo I/O unit is provided in the pseudo I/O system and a file where information of an I/O device to be simulated is defined and set is set as the setting file; and a processing unit deleting predetermined set contents or restoring the set contents to normal set contents after performing a process according to the set contents if the predetermined contents are set when referencing the setting file, and automatically performing a normal reply process at a next time.

4. A pseudo I/O device for use in a pseudo I/O system that is connected with a device to be tested, and simulates an actual I/O system, comprising:

a setting unit receiving a file where contents of an error of a pseudo target are defined and set and setting the file as a setting file, the contents of the file being used to process commands from various types of devices including devices of a different type than the device to be tested;

a receiving unit receiving a command from the device to be tested;

a pseudo I/O unit processing the command received by said receiving unit according to set contents when contents corresponding to the command are set when referencing the setting file, and performing a normal reply process if the contents corresponding to the command are not set;

a transmitting unit returning data after being processed to the device to be tested at a request source; and a hardware error generating unit making a hardware error occur in hardware when error contents of the hardware are set in the setting file.

5. A pseudo I/O device for use in a pseudo I/O system that is connected with a device to be tested, and simulates an actual I/O system, comprising:

a setting unit receiving a file where contents of an error of a pseudo target are defined and set and setting the file as a setting file, the contents of the file being used to process commands from various types of devices including devices of a different type than the device to be tested;

a receiving unit receiving a command from the device to be tested;

a pseudo I/O unit processing the command received by said receiving unit according to set contents when the contents corresponding to the command are set when referencing the setting file, and performing a normal reply process when the contents corresponding to the command are not set;

a transmitting unit returning data after being processed to the device to be tested at a request source, where only one pseudo I/O unit is provided in the pseudo I/O system; and a protocol error generating unit making a set error of a protocol occur in a portion processing the protocol when contents of the error of the protocol are set in the setting file.

6. A pseudo I/O device for use in a pseudo I/O system that is connected with a device to be tested, and simulates an actual I/O system, comprising:

a setting unit receiving a file where contents of an error of a pseudo target are defined and set, and setting the file as a setting file;

a receiving unit receiving a command from the device to be tested;

a pseudo I/O unit processing the command received by said receiving unit according to set contents when the contents corresponding to the command are set when referencing the setting file, and performing a normal reply process when the contents corresponding to the command are not set;

a transmitting unit returning data after being processed to the device to be tested at a request source, where only one pseudo I/O unit is provided in the pseudo I/O system; and an error occurrence timing specifying unit specifying timing at which a hardware error is made to occur, or timing at which a protocol error is made to occur, while processing the command received from the device to be tested.

7. The pseudo I/O device according to claim 6, wherein as the timing at which a hardware or a protocol error is made to occur, timing at which an address to be processed by the device to be tested and an address set in the setting file match, or timing at which the address to be processed and an error address stored when an error occurs match is specified.

8. The pseudo I/O device according to claim 6, wherein as the timing at which a hardware or a protocol error is made to occur, any of the moment when error contents are set in the setting file, timing at which data is received, timing at which transfer data becomes a specified data transfer size during data transfer, and timing at which a status signal is transmitted is specified.

9. The pseudo I/O device according to claim 6, wherein as the hardware error or the protocol error, any of a delay in a transmission start time of frame contents, a phenomenon that part or a whole of frame contents are not transmitted, a change in frame contents, a change in data transfer,information, a change in a data transfer method, and a change in a link state is used.

10. A pseudo I/O device for use in a pseudo I/O system that is connected with a device to be tested, and simulates an actual I/O system, comprising:
- a setting unit receiving a file where contents of an error of a pseudo target are defined and set, and setting the file as a setting file;
- a receiving unit receiving a command from the device to be tested;
- a pseudo I/O unit processing the command received by said receiving unit according to set contents when the contents corresponding to the command are set when referencing the setting file, and performing a normal reply process when the contents corresponding to the command are not set;
- a transmitting unit returning data after being processed to the device to be tested at a request source, where only one pseudo I/O unit is provided in the pseudo I/O system;
- a protocol error generating unit making a set error of a protocol occur in a portion processing the protocol, if contents of the error of the protocol are set in the setting file; and
- an error occurrence timing specifying unit specifying timing at which a hardware error is made to occur, or timing at which a protocol error is made to occur, while processing the command received from the device to be tested.

11. A pseudo I/O device for use in a pseudo I/O system that is connected with a device to be tested, and simulates an actual I/O system, comprising:
- a setting unit receiving a file where contents of an error of a pseudo target are defined and set, and setting the file as a setting file;
- a receiving unit receiving a command from the device to be tested;
- a pseudo I/O unit processing the command received by said receiving unit according to set contents when contents corresponding to the command are set when referencing the setting file, and performing a normal reply process if the contents corresponding to the command are not set;
- a transmitting unit returning data after being processed to the device to be tested at a request source; and
- a hardware error generating unit making a hardware error occur in hardware if error contents of the hardware are set in the setting file, wherein as the hardware error or a protocol error, any of a delay in a transmission start time of frame contents, a phenomenon that part or a whole of frame contents are not transmitted, a change in frame contents, a change in data transfer information, a change in a data transfer method, and a change in a link state is used.

12. A pseudo I/O device for use in a pseudo I/O system that is connected with a device to be tested, and simulates an actual I/O system, comprising:
- a setting unit receiving a file where contents of an error of a pseudo target are defined and set, and setting the file as a setting file;
- a receiving unit receiving a command from the device to be tested;
- a pseudo I/O unit processing the command received by said receiving unit according to set contents when the contents corresponding to the command are set when referencing the setting file, and performing a normal reply process when the contents corresponding to the command are not set;
- a transmitting unit returning data after being processed to the device to be tested at a request source, where only one pseudo I/O unit is provided in the pseudo I/O system; and
- a protocol error generating unit making a set error of a protocol occur in a portion processing the protocol, if contents of the error of the protocol are set in the setting file, and
- wherein as a hardware error or the protocol error, any of a delay in a transmission start time of frame contents, a phenomenon that part or a whole of frame contents are not transmitted, a change in frame contents, a change in data transfer information, a change in a data transfer method, and a change in a link state is used.

13. A pseudo I/O method simulating an actual I/O device by making a connection to a device to be tested, comprising:
- receiving a file where error contents of a simulation target are defined and set and setting the file as a setting file, the contents of the file being used to process commands from various types of devices including devices of a different type than the device to be tested;
- receiving a command from the device to be tested;
- performing a pseudo I/O process in which the received command is processed according to set contents when contents corresponding to the command are set when referencing the setting file, and a normal reply process is performed when the contents corresponding to the command are not set;
- returning the data after being processed to the device to be tested at a request source; and
- generating a hardware error in hardware when error contents of the hardware are set in the setting file.

14. A pseudo I/O device for use in a pseudo I/O system that is connected with a device to be tested, and simulates an actual I/O system, comprising:
- a setting unit receiving a file where contents of an error of a pseudo target are defined and set and setting the file as a setting file, the contents of the file being changeable to accommodate various types of devices;
- a receiving unit receiving a command from the device to be tested;
- a pseudo I/O unit processing the command received by said receiving unit according to set contents when the contents corresponding to the command are set when referencing the setting file, and performing a normal reply process when the contents corresponding to the command are not set; and
- a transmitting unit returning data after being processed to the device to be tested at a request source, where only one pseudo I/O unit is provided in the pseudo I/O system,
- wherein the pseudo I/O device is used to test operations of a test device of various types including an analyzer, a driver of an actual device, a driver installed on an OS, and a RAID controller controlling a RAID device by adaptively changing the contents of the file.

15. A pseudo I/O method simulating an actual I/O device by making a connection to a device to be tested, comprising:
- receiving a file where error contents of a simulation target are defined and set and setting the file as a setting file, the contents of the file being changeable to accommodate various types of devices;
- receiving a command from the device to be tested;
- performing a pseudo I/O process in which the received command is processed according to set contents when contents corresponding to the command are set when referencing the setting file, and a normal reply process is performed when the contents corresponding to the command are not set;

returning the data after being processed to the device to be tested at a request source; and generating a hardware error in hardware when error contents of the hardware are set in the setting file, and wherein the pseudo I/O method used to test operations of a test device of various types including an analyzer, a driver of an actual device, a driver installed on an OS, and a RAID controller controlling a RAID device.

16. A pseudo I/O method simulating an actual I/O device by making a connection with a device to be tested, comprising:

setting a single file having contents of an error of a pseudo target, the contents of the file being useable to process commands from various types of devices including devices of a different type than the device to be tested; and referencing the file and processing a command from the device to be tested according to the set contents in the file when the set contents of the file correspond to the command for simulating the actual I/O device, where a hardware error is generated when error contents of the hardware are set in the file.

17. A pseudo I/O method simulating an actual I/O device by making a connection with a device to be tested, comprising:

modifying an original file having contents of an error of a first pseudo target to be tested and setting the modified file to test a second pseudo target, the first pseudo target and the second pseudo target being different types of devices; and using the modified file in processing a command from the second pseudo target according to set contents of the modified file when the set contents of the modified file correspond to the command, where contents of an error in the modified file are invalidated subsequent to processing the command to cause a normal reply from the second pseudo target.

* * * * *

UNITED STATES PATENT AND TRADEMARK OFFICE
CERTIFICATE OF CORRECTION

| | |
|---|---|
| PATENT NO. | : 7,159,142 B2 |
| APPLICATION NO. | : 10/028279 |
| DATED | : January 2, 2007 |
| INVENTOR(S) | : Hirobumi Yamaguchi et al. |

It is certified that error appears in the above-identified patent and that said Letters Patent is hereby corrected as shown below:

Column 23, Line 22, change "tested:" to --tested;--.

Column 24, Line 66, change "transfer,information," to --transfer information--.

Signed and Sealed this

Tenth Day of April, 2007

JON W. DUDAS
*Director of the United States Patent and Trademark Office*